United States Patent
Fukuta et al.

(10) Patent No.: US 9,538,501 B2
(45) Date of Patent: Jan. 3, 2017

(54) COMMUNICATION CONTROL METHOD AND USER TERMINAL

(71) Applicant: KYOCERA CORPORATION, Kyoto (JP)

(72) Inventors: Noriyoshi Fukuta, Yokohama (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/914,377

(22) PCT Filed: Aug. 25, 2014

(86) PCT No.: PCT/JP2014/072178
§ 371 (c)(1),
(2) Date: Feb. 25, 2016

(87) PCT Pub. No.: WO2015/029953
PCT Pub. Date: Mar. 5, 2015

(65) Prior Publication Data
US 2016/0205665 A1    Jul. 14, 2016

(30) Foreign Application Priority Data

Aug. 27, 2013  (JP) .................. 2013-175715

(51) Int. Cl.
*H04W 72/00* (2009.01)
*H04W 72/02* (2009.01)
H04W 28/26 (2009.01)
H04W 92/18 (2009.01)

(52) U.S. Cl.
CPC ............. *H04W 72/02* (2013.01); *H04W 28/26* (2013.01); *H04W 92/18* (2013.01)

(58) Field of Classification Search
CPC ............... H04W 72/02; H04W 72/082; H04W 72/0406; H04W 76/023; H04W 28/26; H04W 92/18
USPC ..... 455/456.1–456.3, 452.1–452.2, 436–444
See application file for complete search history.

(56) References Cited

U.S. PATENT DOCUMENTS

| 9,271,320 | B2 * | 2/2016 | Lim | .................... H04W 76/023 |
| 2014/0204847 | A1 * | 7/2014 | Belleschi | ............ H04W 76/023 370/329 |

OTHER PUBLICATIONS

International Search Report issued in PCT/JP2014/072178; mailed Nov. 25, 2014.

(Continued)

*Primary Examiner* — Wayne Cai
(74) *Attorney, Agent, or Firm* — Studebaker & Brackett PC

(57) ABSTRACT

A UE 100 is a UE 100 included in a D2D group (a terminal group) including a plurality of UEs 100 (a UE 100-1 and a UE 100-2) in a mobile communication system that supports D2D communication that is direct inter-terminal communication performed within the D2D group. The UE 100 performs UE-initiated scheduling of deciding allocation radio resources that are radio resources used for the D2D communication from among target radio resources reserved in a serving cell in which the D2D group exists and a neighboring cell adjacent to the serving cell when the D2D group is detected to be in a high-speed moving state.

24 Claims, 17 Drawing Sheets

(56) References Cited

OTHER PUBLICATIONS

Written Opinion issued in PCT/JP2014/072178; mailed Nov. 25, 2014.
3rd Generation Partnership Project; Technical Specification Group Services and System Aspects; Feasibility study for Proximity Services (ProSe); 3GPP TR 22.803; V12.1.0; Mar. 2013; pp. 1-45; Release 12; 3GPP Organizational Partners.

* cited by examiner

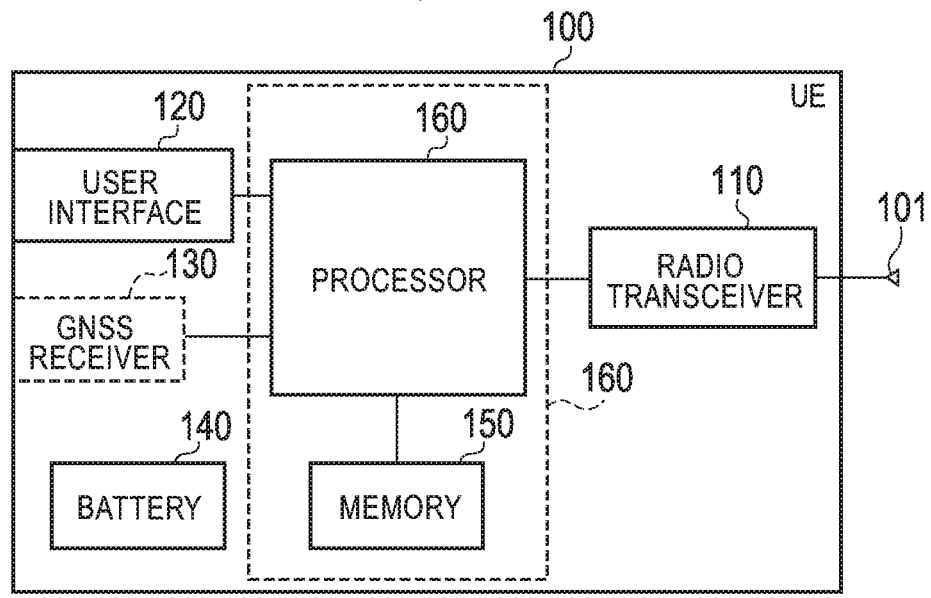
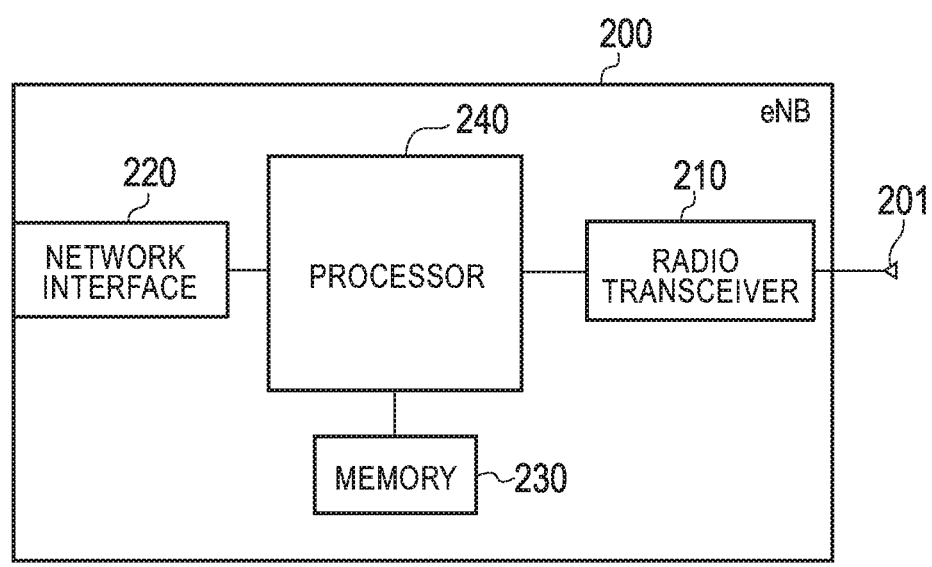

COMMUNICATION CONTROL METHOD AND USER TERMINAL

TECHNICAL FIELD

The present invention relates to a communication control method and a user terminal used in a mobile communication system that supports device to device (D2D) communication.

BACKGROUND ART

In the 3rd Generation Partnership Project (3GPP) that is a mobile communication system standardization project, introduction of a device-to-device communication (D2D) into Release 12 as a new function is under review (see Non Patent Literature 1).

In the D2D communication, direct inter-terminal communication is performed within a terminal group including a plurality of nearby user terminals without intervention of a network. On the other hand, in cellular communication that is common communication of a mobile communication system, user terminals perform communication via a network.

In the D2D communication, radio communication can be performed between nearby user terminals at low transmission power, and thus power consumption of the user terminal and a load of the network can be reduced to be smaller than in the cellular communication.

CITATION LIST

Non Patent Literature

Non Patent Literature 1: 3GPP Technical Report "TR 22.803 V12.1.0," March, 2013

SUMMARY OF INVENTION

By the way, an allocation (D2D scheduling) of radio resources to be used the D2D communication is assumed to be initiated by the network. Specifically, a base station that manages a serving cell in which the terminal group exists decides allocation radio resources to be used in the D2D communication, and notifies the terminal group of the decided allocation radio resources.

However, in this D2D scheduling technique, when the terminal group is in a high-speed moving state (for example, when the D2D communication is performed in an electric train or a bus), it is necessary to switch a base station performing the D2D scheduling one after another with the movement of the terminal group. Thus, there is a problem in that complicated communication control is necessary in order to enable the D2D communication.

In this regard, it is an object of the present invention to provide a communication control method and a user terminal, which enables the D2D communication without the need for complicated communication control even when the terminal group moves at a high speed.

A communication control method according to a first aspect is a method for controlling D2D communication that is direct inter-terminal communication performed in a terminal group including a plurality of user terminals in a mobile communication system. The communication control method comprises the steps of: reserving, by a network, target radio resources that are radio resources scheduled to be used for the D2D communication by the terminal group in a serving cell in which the terminal group exists and a neighboring cell adjacent to the serving cell when the terminal group in a high-speed moving state is detected; and performing, by a first user terminal included in the terminal group, terminal-initiated scheduling of deciding allocation radio resources that are radio resources used for the D2D communication from among the reserved target radio resources.

A user terminal according to a second aspect is a user terminal included in a terminal group including a plurality of user terminals in a mobile communication system configured to support D2D communication that is direct inter-terminal communication performed within the terminal group. The user terminal comprises a controller configured to perform terminal-initiated scheduling of deciding allocation radio resources that are radio resources used for the D2D communication from among target radio resources reserved in a serving cell in which the terminal group exists and a neighboring cell adjacent to the serving cell when the terminal group is detected to be in a high-speed moving state.

BRIEF DESCRIPTION OF DRAWINGS

FIG. 2 is a block diagram illustrating a UE according to the first to fourth embodiments.

FIG. 3 is a block diagram illustrating an eNB according to the first to fourth embodiments.

DESCRIPTION OF EMBODIMENTS

Overview of Embodiments

Figure 1:
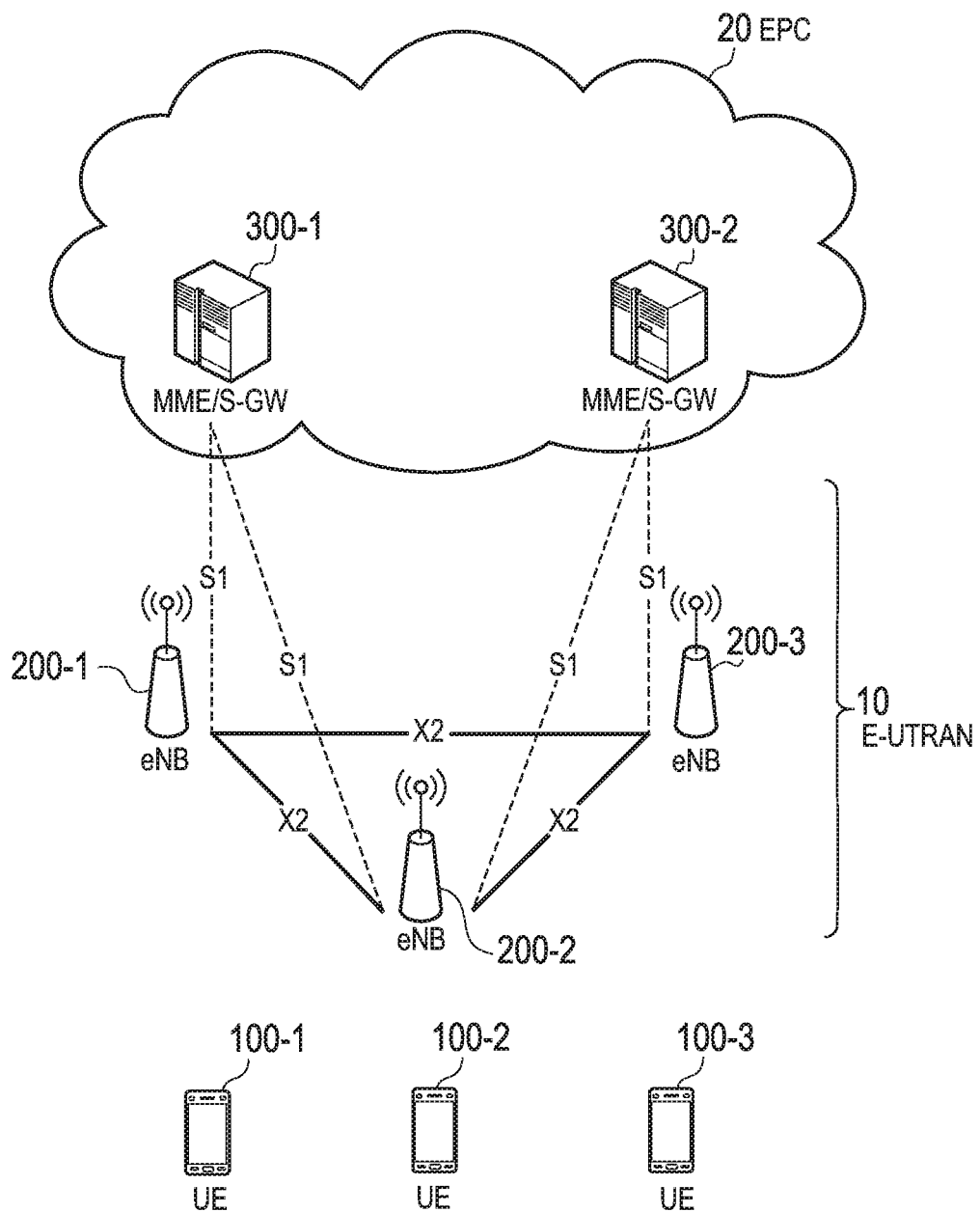
FIG. 1 is a configuration diagram illustrating an LTE system according to first to fourth embodiments.

A communication control method according to a first embodiment to a fourth embodiment is a method for controlling D2D communication that is direct inter-terminal communication performed in a terminal group including a plurality of user terminals in a mobile communication system, the communication control method comprises: the steps of: reserving, by a network, target radio resources that are radio resources scheduled to be used for the D2D communication by the terminal group in a serving cell in which the terminal group exists and a neighboring cell adjacent to the serving cell when the terminal group in a high-speed moving state is detected; and performing, by a first user terminal included in the terminal group, terminal-initiated scheduling of deciding allocation radio resources that are radio resources used for the D2D communication from among the reserved target radio resources.

The communication control method according to the first embodiment further comprise the step of performing, by a first base station that manages the serving cell in the network, base station-initiated scheduling of deciding the allocation radio resources when allocating radio resources to the terminal group that are not in the high-speed moving state.

The communication control method according to a first modification of the first embodiment further comprises the step of reserving, by the network, the target radio resources in the serving cell without reserving the target radio resources in the neighboring cell when allocating radio resources to the terminal group that are not in the high-speed moving state.

In the first embodiment, the target radio resources are prohibited from being allocated to a second user terminal that is not included in the terminal group.

In a second modification of the first embodiment, the target radio resources are allowed to be allocated to a second user terminal that is not included in the terminal group. The communication control method further comprises the step of correcting, by the network, a modulation and encoding scheme to be applied to the second user terminal based on a moving speed of the terminal group when allocating the target radio resources to the second user terminal.

In a third modification of the first embodiment, the target radio resources are allowed to be allocated to a second user terminal that is not included in the terminal group. The communication control method further comprises the step of preferentially allocating, by the network, the target radio resources to the second user terminal of which transmission power level is set to a low level.

The communication control method according to the first embodiment further comprises the step of transmitting a first high-speed movement notification from the first user terminal to the serving cell in response to the detecting of the high-speed moving state by the first user terminal.

In the first embodiment, the first high-speed movement notification includes in-use resource information indicating radio resources being used for the D2D communication in the terminal group.

The communication control method according to a fourth modification of the first embodiment further comprises the step of transmitting, by the network that has received the first high-speed movement notification, reserved resource information indicating the target radio resources to the first user terminal.

The communication control method according to the first embodiment further comprises the step of transmitting, by a first base station that manages the serving cell, a second high-speed movement notification to a second base station that manages the neighboring cell in response to the reception of the first high-speed movement notification. The second high-speed movement notification includes reserved resource information indicating the target radio resources.

The communication control method according to a fifth modification of the first embodiment further comprises the step of discarding, by a mobile relay station, the first high-speed movement notification received from the first user terminal when the relay station manages the serving cell and moves together with the terminal group.

The communication control method according to a fifth modification of the first embodiment further comprises the step of transmitting, by the first user terminal, the first high-speed movement notification to a changed serving cell when a mobile relay station manages the serving cell, the relay station moves together with the terminal group, and the serving cell is changed.

The communication control method according to the first embodiment and the second embodiment further comprises the step of allocating, by the network, a D2D radio network temporary identifier (D2D-RNTI) that is used in common in an area including the serving cell and the neighboring cell to the terminal group in the high-speed moving state in response to the reception of the first high-speed movement notification.

In a modification of the second embodiment, the D2D-RNTI includes a body portion in which one body portion is allocated in the predetermined area and extension portions each of which differs according to each of the user terminals included in the terminal group.

The communication control method according to the first embodiment and the second embodiment further comprises the step of managing, by a core network accommodating a plurality of base stations in the network, an allocation of the D2DRNTI.

The communication control method according to the first embodiment and the second embodiment further comprises the steps of: deciding, by the core network, the D2D-RNTI to be allocated to the terminal group from among non-allocated D2D-RNTIs; and notifying, by the core network, the terminal group of the decided D2D-RNTI.

The communication control method according to the second embodiment further comprises the step of omitting a handover process when the terminal group to which the D2D-RNTI is allocated changes the serving cell with movement of the terminal group.

The communication control method according to the second embodiment further comprises the step of ending the D2D communication when the terminal group to which the D2D-RNTI is allocated has moved to be outside a service area of the mobile communication system.

The communication control method according to the second embodiment further comprises the step of releasing the D2D-RNTI when a certain period of time elapses after the D2D communication ends when the terminal group to which the D2D-RNTI is allocated ends the D2D communication.

The communication control method according to the second embodiment further comprises the steps of: transmitting a tracking area update message from the first user terminal to the network when the terminal group to which the D2D-RNTI is allocated changes a tracking area to exist in with movement of the terminal group; and allocating, by the network that has received the tracking area update message, a new D2D-RNTI to the terminal group.

The communication control method according to the third embodiment further comprises the steps of: allocating, by a first base station that manages the serving cell in the network, cell radio network temporary identifier (C-RNTI) used in the serving cell to the first user terminal when the terminal group has transitioned from the high-speed moving state to a non-high-speed moving state; and releasing the D2D-RNTI when the terminal group has transitioned from the high-speed moving state to the non-high-speed moving state.

The communication control method according to a modification of the third embodiment further comprises the step of maintaining the D2D-RNTI without allocating the C-RNTI in a case where the terminal group is determined to be likely to transition to the high-speed moving state again even when the terminal group has transitioned from the high-speed moving state to the non-high-speed moving state.

The communication control method according to the fourth embodiment further comprises the steps of: reserving, by the network, state notification resource that is uplink radio resources used for state notification to be given from the terminal group to the network in the serving cell and the neighboring cell in response to the reception of the first high-speed movement notification; transmitting, by the network, state notification resource information indicating the reserved state notification resource to the terminal group; and transmitting, by the first user terminal, state notification information to the network together with the D2D-RNTI using the state notification resources indicated by the state notification resource information.

A user terminal according to the first embodiment to the fourth embodiment is a user terminal included in a terminal group including a plurality of user terminals in a mobile communication system configured to support D2D communication that is direct inter-terminal communication performed within the terminal group. The user terminal comprises: a controller configured to perform terminal-initiated scheduling of deciding allocation radio resources that are radio resources used for the D2D communication from among target radio resources reserved in a serving cell in which the terminal group exists and a neighboring cell adjacent to the serving cell when the terminal group is detected to be in a high-speed moving state.

First Embodiment

Hereinafter, embodiments in which the present invention is applied to the LTE system will be described.

(System Architecture)

FIG. 1 is a diagram illustrating the LTE system according to the embodiment. As illustrated in FIG. 1, the LTE system according to the embodiment includes UE (User Equipment) 100, E-UTRAN (Evolved-UMTS Terrestrial Radio Access Network) 10, and EPC (Evolved Packet Core) 20.

The UE 100 corresponds to a user terminal. The UE 100 is a mobile communication device, which performs radio communication with a cell (a serving cell) with which a connection is established. The architecture of the UE 100 will be described later.

The E-UTRAN 10 corresponds to a radio access network. The E-UTRAN 10 includes eNB 200 (evolved Node-B). The eNB 200 corresponds to a base station. The eNBs 200 are connected mutually via an X2 interface. The architecture of the eNB 200 will be described later.

The eNB 200 manages one or a plurality of cells, and performs radio communication with the UE 100 that establishes a connection with a cell of the eNB 200. The eNB 200 has a radio resource management (RRM) function, a routing function of user data, and a measurement control function for mobility control and scheduling.

The "cell" is used as a term indicating a smallest unit of a radio communication area, and is also used as a term indicating a function of performing radio communication with the UE 100. One tracking area is configured by a plurality of cells. Tracking area is an area unit for grasping location of the UE 100 in idle state by a network.

The EPC 20 corresponds to a core network. A network of the LTE system is configured by the E-UTRAN 10 and the EPC 20. The EPC 200 accommodates a plurality of eNB 200s.

The EPC 20 includes MME (Mobility Management Entity)/S-GW (Serving-Gateway) 300. The MME performs different types of mobility control and the like for the UE 100. Furthermore, the MME manages information on a tracking area or a cell in which the UE 100 exists. The S-GW performs transfer control of the user data. The MME/S-GW 300 is connected to the eNB 200 via an S1 interface.

FIG. 2 is a block diagram illustrating the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 configure a controller. The UE 100 may not necessarily include the GNSS receiver 130. Furthermore, the memory 150 may be integrally formed with the processor 160, and this set (that is, a chipset) may be called a processor 160'.

The antenna 101 and the radio transceiver 110 are used to transmit and receive a radio signal. The radio transceiver 110 converts a baseband signal (a transmission signal) output from the processor 160 into a radio signal, and transmits the radio signal from the antenna 101. Furthermore, the radio transceiver 110 converts a radio signal received by the antenna 101 into a baseband signal (a reception signal), and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for processing by the processor 160. The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various processes and various communication protocols described later.

FIG. 3 is a block diagram illustrating the eNB 200. As illustrated in FIG. 3, the eNB 200 includes an antenna 201, a radio transceiver 210, a network interface 220, a memory 230, and a processor 240. The memory 230 and the processor 240 configure a controller.

The antenna 201 and the radio transceiver 210 are used to transmit and receive a radio signal. The radio transceiver 210 converts a baseband signal (a transmission signal) output from the processor 240 into a radio signal, and transmits the radio signal from the antenna 201. Furthermore, the radio transceiver 210 converts a radio signal received by the antenna 201 into a baseband signal (a reception signal), and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for processing by the processor 240. The processor 240 includes the baseband processor that performs modulation and demodulation, encoding and decoding and the like on the baseband signal and a CPU that performs various processes by executing the program stored in the memory 230. The processor 240 executes various processes and various communication protocols described later.

Figure 4:
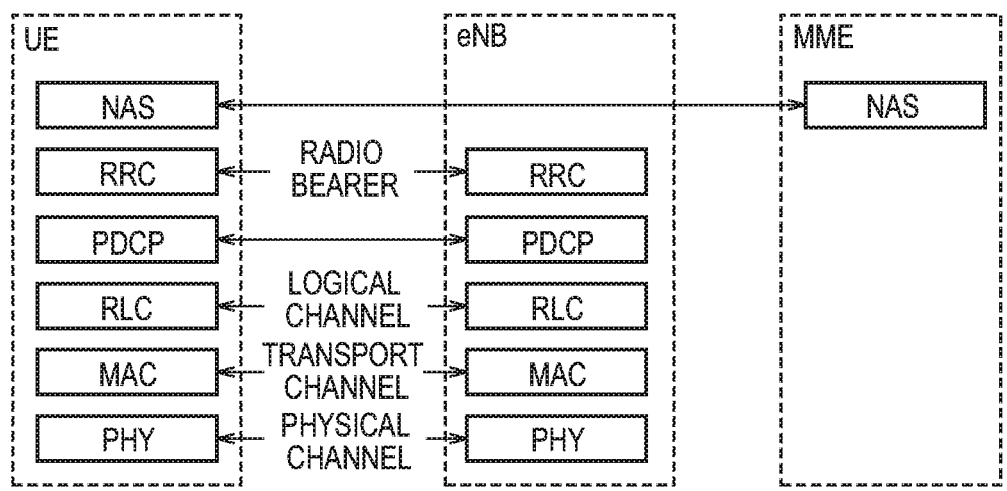
FIG. 4 is a protocol stack diagram of a radio interface according to the first to fourth embodiments.

FIG. 4 is a protocol stack diagram illustrating a radio interface in the LTE system. As illustrated in FIG. 4, the radio interface protocol is classified into a first layer to a third layer of an OSI reference model, such that the first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs encoding and decoding, modulation and demodulation, antenna mapping and demapping, and resource mapping and demapping. Between the physical layer of the UE 100 and the physical layer of the eNB 200, user data and control signals are transmitted via a physical channel.

The MAC layer performs priority control of data, and a retransmission process and the like by a hybrid ARQ (HARQ). Between the MAC layer of the UE 100 and the MAC layer of the eNB 200, user data and control signals are transmitted via a transport channel. The MAC layer of the eNB 200 includes a scheduler for determining (scheduling) a transport format (a transport block size and a modulation and coding scheme) of an uplink and a downlink, resource blocks to be assigned to the UE 100, and a transmission power.

The RLC layer transmits data to an RLC layer of a reception side by using the functions of the MAC layer and the physical layer. Between the RLC layer of the UE 100 and the RLC layer of the eNB 200, user data and control signals are transmitted via a logical channel.

The PDCP layer performs header compression and decompression, and encryption and decryption.

The RRC layer is defined only in a control plane that handles control signals. Between the RRC layer of the UE 100 and the RRC layer of the eNB 200, a control signal (an RRC message) for various types of settings is transmitted. The RRC layer controls the logical channel, the transport channel, and the physical channel according to the establishment, re-establishment, and release of a radio bearer. When there is a connection (RRC connection) between the RRC of the UE 100 and the RRC of the eNB 200, the UE 100 is in a connected state (RRC connected state). Otherwise, the UE 100 is in an idle state (RRC idle state).

An NAS (Non-Access Stratum) layer positioned above the RRC layer performs session management, mobility management and the like.

Figure 5:
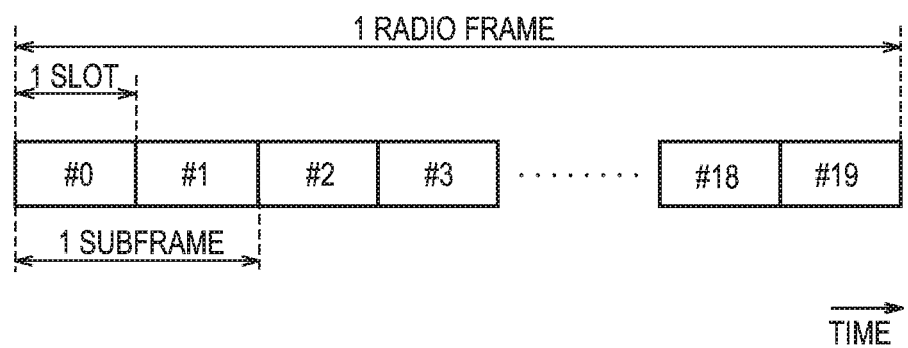
FIG. 5 is a configuration diagram illustrating a radio frame according to the first to fourth embodiments.

FIG. 5 is a diagram illustrating a radio frame used in the LTE system. In the LTE system, OFDMA (Orthogonal Frequency Division Multiplexing Access) is applied to a downlink (DL), and SC-FDMA (Single Carrier Frequency Division Multiple Access) is applied to an uplink (UL), respectively.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction. A resource element is configured by one subcarrier and one symbol.

Of the radio resources assigned to the UE 100, a frequency resource is configured by a resource block, and a time resource is configured by a subframe (or a slot).

In the downlink, an interval of several symbols at the head of each subframe is a region used as a physical downlink control channel (PDCCH) for mainly transmitting a downlink control signal. Furthermore, the remaining portion of each subframe is a region available as a physical downlink shared channel (PDSCH) for mainly transmitting downlink user data.

In the uplink, each of both end portions in a frequency direction of each subframe is a region used as a physical uplink control channel (PUCCH) for mainly transmitting an uplink control signal. The remaining portion of each subframe is a region available as a physical uplink shared channel (PUSCH) for mainly transmitting uplink user data.

(D2D Communication)

Figure 6:
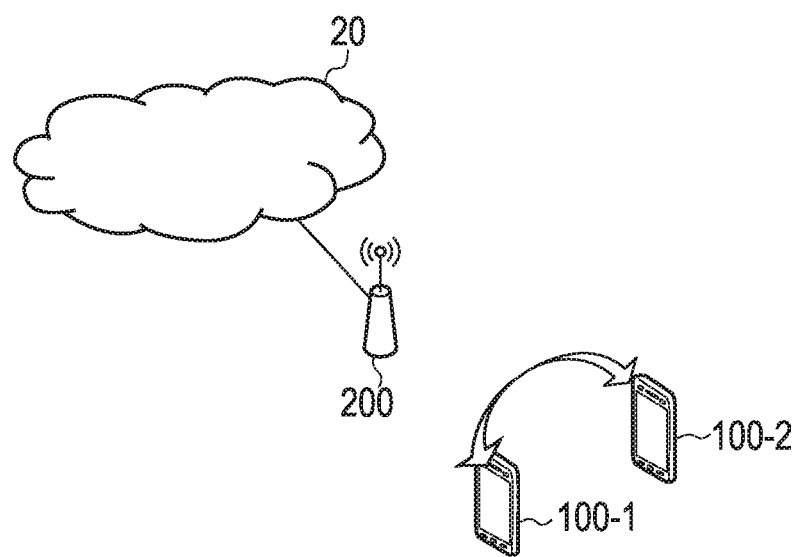
FIG. 6 is a diagram for describing D2D communication according to the first to fourth embodiments.

An LTE system according to a first embodiment supports D2D communication that is direct inter-terminal communication (inter-UE communication). FIG. 6 is a diagram for describing the D2D communication according to the first embodiment.

Here, the D2D communication will be described while comparing with cellular communication that is common communication of the LTE system. The cellular communication is a communication mode in which a data path passes through a network (the E-UTRAN 10 and the EPC 20). The data path refers to a communication path of user data.

On the other hand, the D2D communication is a communication mode in which a data path set between the UEs does not pass through a network as illustrated in FIG. 6. A plurality of UEs 100 (the UE 100-1 and the UE 100-2) that are close to each other directly perform radio communication at low transmission power in the cell of the eNB 200.

As described above, as a plurality of UEs 100 that are close to each other directly perform radio communication at low transmission power, it is possible to reduce the power consumption of the UE 100 and interference to a neighboring cell to be smaller than in the cellular communication.

An allocation (D2D scheduling) of radio resources to be used the D2D communication is assumed to be initiated by the network. Specifically, the eNB 200 that manages the serving cell in which a D2D group (a terminal group) including a plurality of UEs 100 that are close to each other exist decides allocation radio resources to be used in the D2D communication, and notifies the D2D group of the decided allocation radio resources.

However, in this D2D scheduling technique, when the D2D group is in a high-speed moving state (for example, when the D2D communication is performed in an electric train or a bus), it is necessary to switch the eNB 200 performing the D2D scheduling one after another with the movement of the D2D group. Thus, in order to enable the D2D communication, complicated communication control is necessary.

(Communication Control Method According to First Embodiment)

Next, a communication control method according to the first embodiment will be described. Specifically, an operation for enabling the D2D communication without the need for complicated communication control even when the D2D group moves at a high speed will be described.

(1) Schematic Operation

Figure 7:
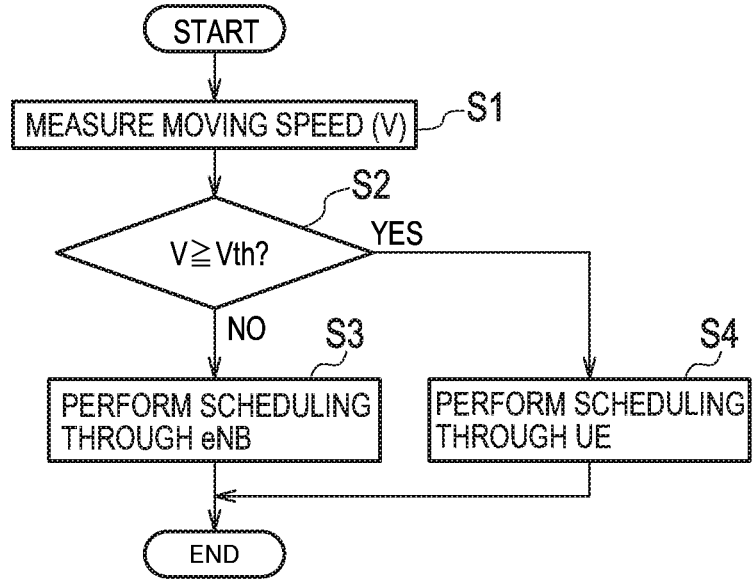
FIG. 7 is a flowchart illustrating a schematic operation according to the first embodiment.

FIG. 7 is a flowchart illustrating a schematic operation according to the first embodiment.

As illustrated in FIG. 7, in step S1, a moving speed (V) of the D2D group is measured. In the first embodiment, the UE 100 included in the D2D group measures the moving speed (V).

In step S2, the moving speed (V) of the D2D group is compared with a threshold value (Vth). In the first embodiment, the UE 100 included in the D2D group detects the high-speed moving state by comparing the moving speed (V) with the threshold value (Vth).

When the moving speed (V) of the D2D group is less than the threshold value (Vth) (No in step S2), the D2D group is not in the high-speed moving state (the non-high-speed moving state). In this case, in step S3, the eNB 200 that manages the serving cell of the D2D group performs D2D scheduling (eNB-initiated scheduling).

On the other hand, when the moving speed (V) of the D2D group is the threshold value (Vth) or larger (Yes in step S2), the D2D group is in the high-speed moving state. In this case, in step S4, the UE 100 included in the D2D group performs D2D scheduling (UE-initiated scheduling).

(2) Operation of UE 100

Figure 8:
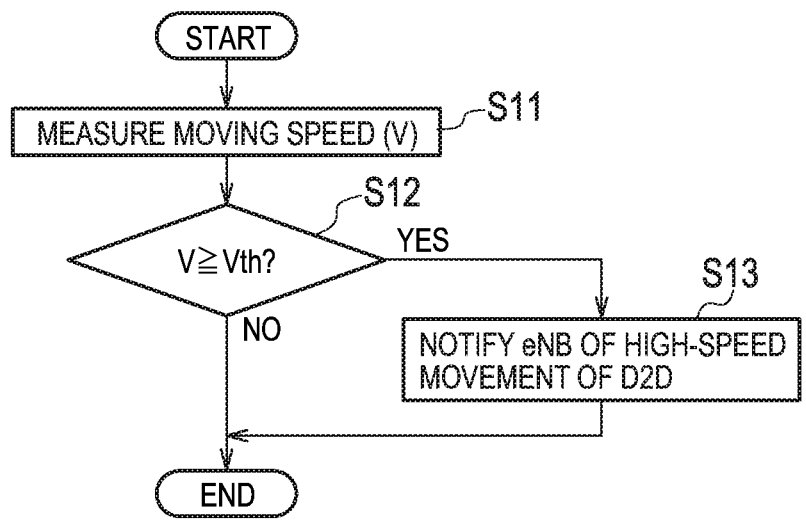
FIG. 8 is a flowchart illustrating an operation of a UE according to the first embodiment.

FIG. 8 is a flowchart illustrating an operation of the UE 100 according to the first embodiment.

As illustrated in FIG. 8, in step S11, the UE 100 included in the D2D group measures their own moving speed (V), that is, the moving speed (V) of the D2D group. For example, the UE 100 measures the moving speed (V) based on position information that is periodically obtained using the GNSS receiver 130. Alternatively, the UE 100 may estimate the moving speed (V) based on the number of handovers per unit time, the number of cell reselections per unit time, or a fading speed of a reception signal.

In step S12, the UE 100 included in the D2D group compares the moving speed (V) of the D2D group with the threshold value (Vth). The threshold value (Vth) may be stored in the UE 100 or may be set to the UE 100 from the network. For example, the threshold value (Vth) may be set to a value of about 50 to 60 km/h.

When the moving speed (V) of the D2D group is the threshold value (Vth) or larger (Yes in step S12), the D2D group is in the high-speed moving state. In this case, in step S13, the UE 100 that has detected the high-speed moving state transmits a high-speed movement notification (a first high-speed movement notification). The high-speed movement notification includes in-use resource information indicating radio resources that are being used for the D2D communication in the D2D group.

(3) Operation of eNB 200

Figure 9:
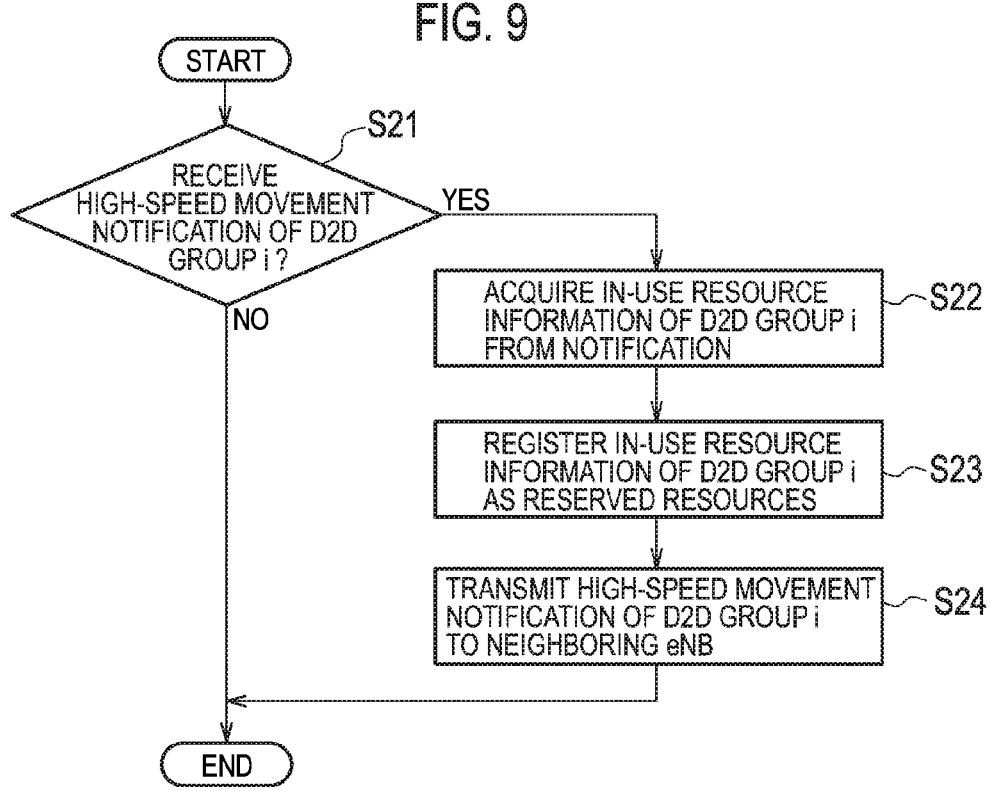
FIG. 9 is a flowchart illustrating an operation of an eNB when a high-speed movement notification is received according to the first embodiment.

FIG. 9 is a flowchart illustrating an operation of the eNB 200 when the high-speed movement notification is received according to the first embodiment.

As illustrated in FIG. 9, in step S21, the eNB 200 that manages the serving cell of the UE 100 included in a D2D group (i) receives the high-speed movement notification from the UE 100.

When the high-speed movement notification is received (Yes in step S21), in step S22, the eNB 200 acquires the in-use resource information included in the high-speed movement notification.

In step S23, the eNB 200 reserves radio resources indicated by the in-use resource information as target radio resources that are radio resources that are scheduled to be used for the D2D communication by the D2D group (i). Hereinafter, reserved target radio resources are referred to as "reserved resources." The eNB 200 stores the reserved resources.

In step S24, the eNB 200 transmits a high-speed movement notification (a second high-speed movement notification) to another eNB 200 (a neighboring eNB 200) that manages a neighboring cell. The high-speed movement notification includes reserved resource information indicating the reserved resources. The neighboring eNB 200 that has received the high-speed movement notification from the eNB 200 stores the reserved resources indicated by the reserved resource information included in the high-speed movement notification.

Figure 10:
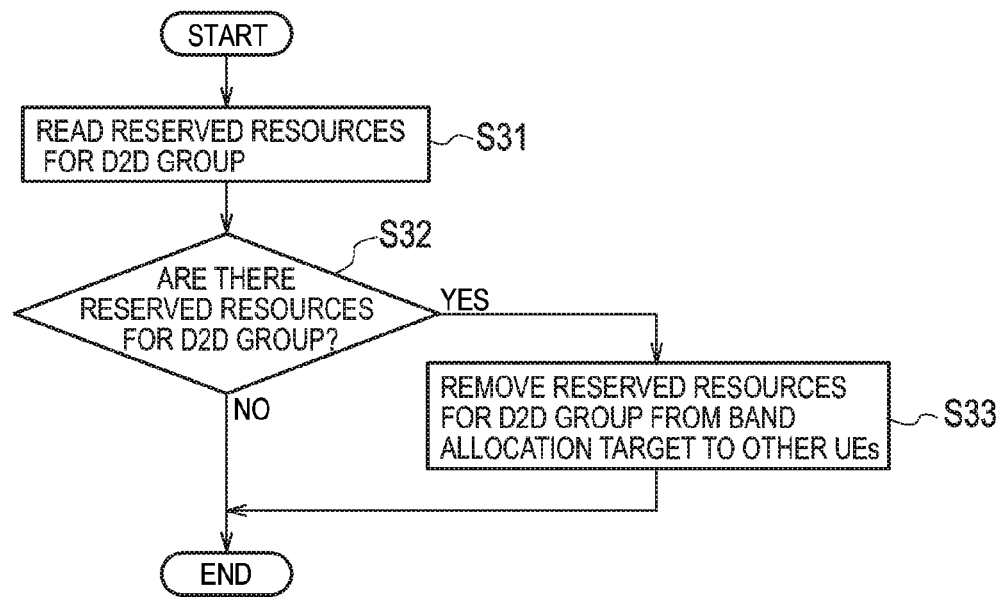
FIG. 10 is a flowchart illustrating an operation of an eNB at the time of scheduling according to the first embodiment.

FIG. 10 is a flowchart illustrating an operation of the eNB 200 at the time of scheduling according to the first embodiment. This operation is performed by the eNB 200 that has received the high-speed movement notification (the first high-speed movement notification) from the UE 100 and the neighboring eNB 200 that has received the high-speed movement notification (the second high-speed movement notification) from the eNB 200.

As illustrated in FIG. 10, in step S31, the eNB 200 reads the reserved resources for the D2D group.

When there are the reserved resources for the D2D group (Yes in step S32), in step S33, the eNB 200 prohibits an allocation of the reserved resources. In other words, the eNB 200 performs scheduling such that the reserved resources are not allocated to the UE 100 that is not included in the D2D group.

(4) Operation Sequence

Figure 11:
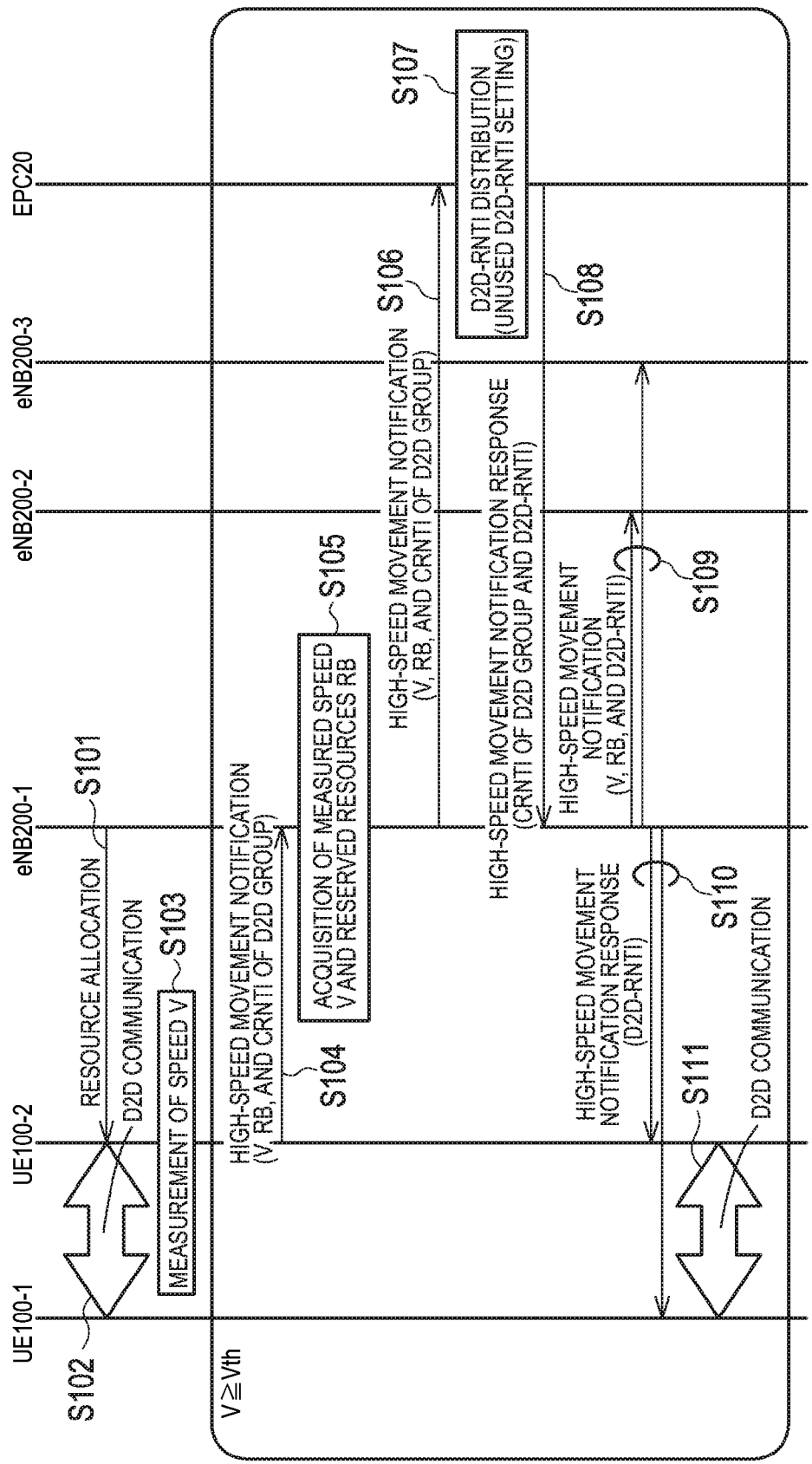
FIG. 11 is a sequence diagram illustrating an operation according to the first embodiment.

FIG. 11 is a sequence diagram illustrating an operation according to the first embodiment. Here, the D2D group is configured with the UE 100-1 and the UE 100-2, and the UE 100-2 is assumed to be a UE that performs control related to the D2D communication.

The eNB 200-1 manages the serving cell of the D2D group, and the eNB 200-2 and the eNB 200-3 manages neighboring cells adjacent to the serving cell. In an initial state of the present sequence, the UE 100-1 and the UE 100-2 are in an RRC connection state, and a cell radio network temporary identifier (C-RNTI) is allocated from the eNB 200-1 to the UE 100-1 and the UE 100-2.

As illustrated in FIG. 11, in step S101, the eNB 200-1 decides the allocation radio resources for the D2D group (the UE 100-1 and the UE 100-2), and notifies the UE 100-2 of the allocation radio resources. The UE 100-2 notifies the UE 100-1 of the allocation radio resources reported from the eNB 200-1, and the UE 100-1 and the UE 100-2 perform the D2D communication using the allocation radio resources (step S102). Alternatively, the eNB 200-1 notifies the UE 100-1 and the UE 100-2 of the allocation radio resources, and the UE 100-1 and the UE 100-2 performs the D2D communication using the allocation radio resources.

In step S103, the UE 100-2 measures their own moving speed (V), that is, the moving speed (V) of the D2D group, and compares the measured moving speed (V) with the threshold value (Vth). Here, the description will proceed under the assumption that the moving speed (V) is the threshold value (Vth) or larger.

In step S104, the UE 100 that has detected the high-speed moving state transmits the high-speed movement notification (the first high-speed movement notification) to the eNB 200-1. The high-speed movement notification includes the in-use resource information indicating radio resources (RB) being used for the D2D communication in the D2D group. The high-speed movement notification further includes the C-RNTI allocated to each of the UE 100-1 and the UE 100-2. The high-speed movement notification may further include speed information indicating the measured moving speed (V). For example, the speed information is used for correction of a modulation and encoding scheme (MCS). The correction of the MCS will be described later in a second modification of the first embodiment.

In step S105, the eNB 200-1 that has received the high-speed movement notification acquires the in-use resource information included in the high-speed movement notification and the speed information, and stores the radio resources indicated by the acquired in-use resource information as the reserved resources (RB).

In step S106, the eNB 200-1 transfers the high-speed movement notification received from the UE 100-2 to the EPC 20.

In step S107, the EPC 20 that has received the high-speed movement notification allocates a D2D radio network temporary identifier (a D2D-RNTI) to the D2D group (the UE 100-1 and the UE 100-2) based on the C-RNTIs included in the high-speed movement notification. The D2D-RNTI is an RNTI that is used in common in a wide area including the serving cell and the neighboring cell. For example, the D2D-RNTI is used to identify the D2D group in the high-speed moving state, and there are cases in which one D2D-RNTI is allocated to each tracking area and cases in which one D2D-RNTI is allocated to each of the UEs 100 included in the D2D group. The EPC 20 manages an allocation of the D2D-RNTI. Specifically, the EPC 20 decides the D2D-RNTI to be allocated to the D2D group among the D2D-RNTIs that are not allocated among a plurality of previously prepared D2D-RNTIs.

The EPC 20 may change the D2D-RNTI to be allocated after allocating the D2D-RNTI to the D2D group. In this case, the EPC 20 transmits a message including a changed D2D-RNTI to the D2D group through the eNB 200.

In step S108, the EPC 20 transmits a high-speed movement notification response including the D2D-RNTI allocated to the D2D group to the eNB 200-1. The high-speed movement notification response further includes the C-RNTIs included in the high-speed movement notification transmitted from the eNB 200-1.

In step S109, the eNB 200-1 that has received the high-speed movement notification response transmits (reports) the high-speed movement notification (the second high-speed movement notification) to the eNB 200-2 and the eNB 200-3. The high-speed movement notification includes the D2D-RNTI included in the high-speed movement notification response and the reserved resource information indicating the reserved resources (RB) stored for the D2D group indicated by the D2D-RNTI. Each of the eNB 200-2 and the eNB 200-3 that have received the high-speed movement notification stores the reserved resource information (the reserved resources) included in the high-speed movement notification. Further, the eNB 200-1 may include setting information (hereinafter, "RRC setting information") related to an RRC connection with the UE 100 included in the D2D group in the high-speed movement notification (the second high-speed movement notification). In this case, each of the eNB 200-2 and the eNB 200-3 that have received the high-speed movement notification stores the RRC setting information included in the high-speed movement notification in association with the D2D-RNTI.

In step S110, the eNB 200-1 transmits the high-speed movement notification response to the D2D group (the UE 100-1 and the UE 100-2). The high-speed movement notification response includes the D2D-RNTI allocated to the D2D group. Each of the UE 100-1 and the UE 100-2 that have received the high-speed movement notification response stores the D2D-RNTI included in the high-speed movement notification response. Each of the UE 100-1 and the UE 100-2 transitions from the RRC connection state to the RRC idle state after storing the D2D-RNTI.

In step S111, the D2D group (the UE 100-1 and the UE 100-2) performs the D2D communication using the reserved resources (RB). Specifically, the UE 100-2 performs the UE-initiated scheduling for deciding the allocation radio resources that are radio resources used for the D2D communication from among the reserved resources (RB). Then, the UE 100-2 notifies the UE 100-1 of the decide allocation radio resources, and the UE 100-1 and the UE 100-2 perform the D2D communication using the allocation radio resources.

Conclusion of First Embodiment

As described above, the communication control method according to the first embodiment is a method of controlling the D2D communication within the D2D group including a plurality of UEs 100 (the UE 100-1 and the UE 100-2). When the D2D group in the high-speed moving state is detected, the network reserves the target radio resources (the reserved resources) that are the radio resources that are scheduled to be used for the D2D communication by the D2D group in the serving cell in which the D2D group exists and the neighboring cell adjacent to the serving cell. The UE 100 included in the D2D group performs the UE-initiated scheduling for deciding the allocation radio resources that are the radio resources used for the D2D communication from among the reserved resources.

As described above, in the first embodiment, the reserved resources are set to the D2D group in the high-speed moving state in the wide area, and the UE-initiated scheduling is performed within the range of the reserved resources. Here, the "wide area" refers to, for example, a tracking area that are an area including at least the serving cell and the neighboring cell.

Thus, although the D2D group is in the high-speed moving state (for example, the D2D communication is performed in an electric train or a bus), it is unnecessary to switch the eNB 200 performing the D2D scheduling one after another with the movement of the D2D group. Accordingly, it is possible to perform the D2D communication without the need for complicated communication control.

In the first embodiment, when allocating radio resources to the D2D group in the non-high-speed moving state, the eNB 200 that manages the serving cell of the D2D group performs the D2D scheduling (the eNB-initiated scheduling). Thus, as the eNB 200 performs the scheduling for the D2D group in the non-high-speed moving state similarly to the cellular communication, it is possible to finely control the allocation radio resources for the D2D communication.

In the first embodiment, the reserved resources are prohibited from being allocated to the UE 100 that is not included in the D2D group. Thus, it is possible to prevent the occurrence of interference between the UE 100 included in the D2D group and the UE 100 that is not included in the D2D group.

In the first embodiment, in response to the detecting of the high-speed moving state by the UE 100, the high-speed movement notification (the first high-speed movement notification) is transmitted from the UE 100 to the serving cell. Thus, the network can detect the D2D group is in the high-speed moving state.

In the first embodiment, the high-speed movement notification (the first high-speed movement notification) includes the in-use resource information indicating the radio resources being used for the D2D communication in the D2D group. Thus, the network sets the radio resources being used for the D2D communication as the reserved resources, and the radio resources can continuously be used in the D2D group.

In the first embodiment, the eNB 200 transmits the high-speed movement notification (the second high-speed movement notification) to the neighboring eNB 200 in response to the reception of the high-speed movement notification (the first high-speed movement notification). The second high-speed movement notification includes the reserved resource information indicating the reserved resources. Thus, the reserved resources can be set even in the neighboring eNB 200.

In the first embodiment, the EPC 20 allocates the D2D-RNTI that is used in common in the tracking area including the serving cell and the neighboring cell to the D2D group in the high-speed moving state. Thus, it is possible to identify the D2D group in the high-speed moving state within the tracking area.

In the first embodiment, the EPC 20 decides the D2D-RNTI to be allocated to the D2D group from among the non-allocated D2D-RNTIs, and notifies the D2D group of the decided D2D-RNTI. Thus, it is possible to uniquely identify the D2D group in the high-speed moving state.

First Modification of First Embodiment

In the first embodiment, the eNB-initiated scheduling is applied to the D2D group in the non-high-speed moving state. However, the UE-initiated scheduling may be applied to the D2D group in the non-high-speed moving state.

In the first modification of the first embodiment, when allocating radio resources to the D2D group in the non-high-speed moving state, the network (the eNB 200) sets the reserved resources in the serving cell without setting the reserved resources in the neighboring cell. Then, the UE 100 included in the D2D group performs the UE-initiated scheduling for the allocation radio resources from among the reserved resources.

As described above, in the first modification of the first embodiment, the UE-initiated scheduling is applied to the D2D group in the non-high-speed moving state after limiting a range in which resource reservation is performed to the serving cell. It is possible to reduce the load of the network associated with the D2D scheduling.

Second Modification of First Embodiment

In the first embodiment, the reserved resources are prohibited from being allocated to the UE 100 that is not included in the D2D group. However, in order to increase use efficiency of the radio resources, the reserved resources may be allowed to be allocated to the UE 100 that is not included in the D2D group.

In the second modification of the first embodiment, the reserved resources are allowed to be allocated to the UE 100 that is not included in the D2D group. When the reserved resources are allocated to the UE 100 that is not included in the D2D group, the network (the eNB 200) corrects the MCS for the UE 100 that is not included in the D2D group based on the moving speed of the D2D group.

Figure 12:
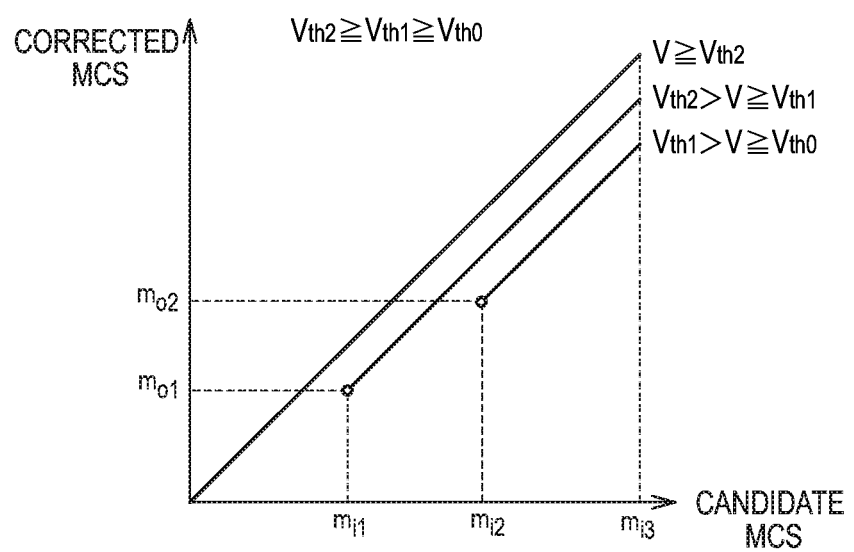
FIG. 12 is a diagram for describing an MCS correction method according to a second modification of the first embodiment.

FIG. 12 is a diagram for describing an MCS correction method according to the second modification of the first embodiment. As described in the first embodiment, the eNBs 200 share the speed information included in the high-speed movement notification. The speed information is information indicating the moving speed (V) of the D2D group (i).

As illustrated in FIG. 12, when the reserved resources corresponding to the D2D group (i) are allocated to the UE 100 that is not included in the D2D group (i), the eNB 200 corrects the MCS to be applied to the UE 100 based on the moving speed (V) of the D2D group (i). In the present modification, the MCS is corrected to improve error resilience because as the moving speed (V) of the D2D group (i) decreases, influence of interference from the D2D group (i) increases. In other words, correction to an MCS (a low-speed MCS) having the higher error resilience than a candidate MCS be originally applied is performed. Further, when the moving speed (V) of the D2D group (i) is low, and it is difficult to correct the candidate MCS to be originally applied, an allocation of the reserved resources is prohibited.

In the example of FIG. 12, when the moving speed (V) of the D2D group (i) has a relation of "Vth1>V≥Vth0," and the candidate MCS of the UE 100 that is not included in the D2D group (i) has a relation of "mi2<MCS," "corrected MCS=candidate MCS−2" is decided. In the other cases, an allocation is prohibited.

Further, when the moving speed (V) of the D2D group (i) has a relation of "Vth2>V≥Vth1," and the candidate MCS of the UE 100 that is not included in the D2D group (i) has a relation of "mi1<MCS," "corrected MCS=candidate MCS−1" is decided. In the other cases, an allocation is prohibited.

Further, when the moving speed (V) of the D2D group (i) has a relation of "V>Vth2," "corrected MCS=candidate MCS" is decided.

As described above, when the reserved resources are allocated to the UE 100 that is not included in the D2D group, the network (the eNB 200) corrects the MCS to be applied to the UE 100 that is not included in the D2D group based on the moving speed of the D2D group. Thus, it is possible to increase the use efficiency of the radio resources and suppress influence of the interference from the D2D group.

Third Modification of First Embodiment

In a third modification of the first embodiment, similarly to the second modification of the first embodiment, the reserved resources are allowed to be allocated to the UE 100 that is not included in the D2D group.

Further, when allocating the reserved resources to the UE 100 that is not included in the D2D group, the network (the eNB 200) preferentially allocates the reserved resources to the UE 100 of which transmission power level is set to a low level. Here, the transmission power level refers to, for example, a transmission power level in the cellular communication. Further, the UE 100 of which transmission power level is set to a low level refers to, for example, the UE 100 existing around the eNB 200. Such a UE 100 can perform excellent radio communication and is high in interference resistance.

Thus, by setting the reserved resources are preferentially allocated to the UE 100 of which transmission power level a low level, it is possible to increase the use efficiency of the radio resources and suppress influence of interference from the D2D group.

Further, by using the third modification of the first embodiment together with the second modification of the first embodiment, it is possible to further suppress influence of interference from the D2D group.

Fourth Modification of First Embodiment

In the first embodiment, the network (the eNB 200) sets the radio resources being used by the D2D group as the reserved resources based on the in-use resource information indicating the radio resources being used by the D2D group. However, the reserved resources may be set without being based on the radio resources being used by the D2D group.

Figure 13:
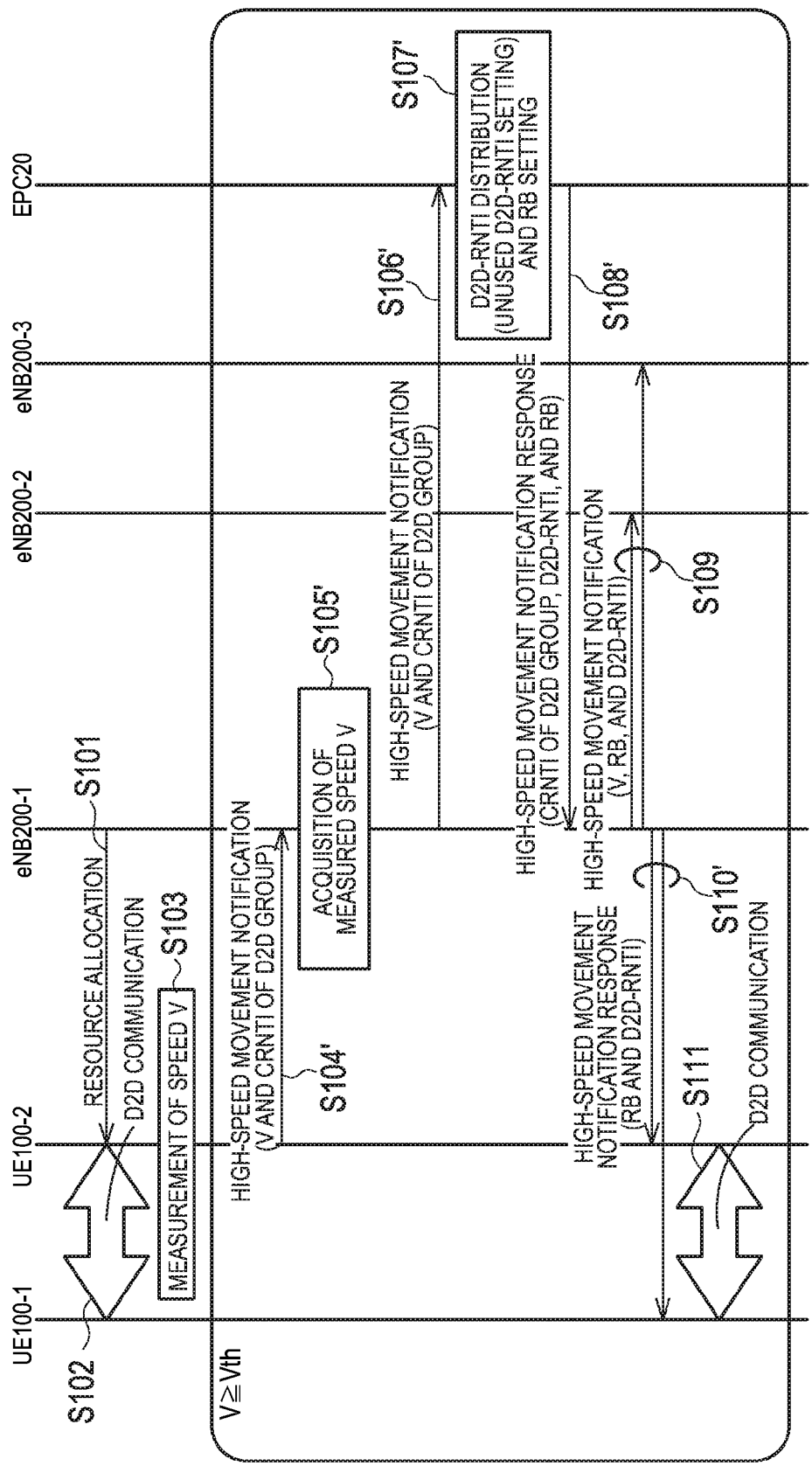
FIG. 13 is a sequence diagram illustrating an operation of a fourth modification of the first embodiment.

FIG. 13 is a sequence diagram illustrating an operation according to a fourth modification of the first embodiment. Here, different points from the operation sequence according to the first embodiment will be described.

As illustrated in FIG. 13, steps S101 to S103 are the same as in the first embodiment.

In step S104', the UE 100 that has detected the high-speed moving state transmits the high-speed movement notification (the first high-speed movement notification) to the eNB 200-1. In the present modification, the high-speed movement notification does not include the in-use resource information.

In step S105', the eNB 200-1 that has received the high-speed movement notification acquires the speed information included in the high-speed movement notification.

In step S106', the eNB 200-1 transfers the high-speed movement notification received from the UE 100-2 from the EPC 20 (the core network).

In step S107', the EPC 20 that has received the high-speed movement notification allocates the D2D-RNTI to the D2D group (the UE 100-1 and the UE 100-2) based on the C-RNTIs included in the high-speed movement notification. In the present modification, the reserved resources are managed in the EPC 20, and the EPC 20 sets the reserved resources (RB).

In step S108', the EPC 20 transmits the high-speed movement notification response including the D2D-RNTI allocated to the D2D group and the reserved resources (RB) to the eNB 200-1. The eNB 200-1 that has received the high-speed movement notification response stores the reserved resources (RB) stored in the high-speed movement notification response.

In step S109, the eNB 200-1 that has received the high-speed movement notification response transmits the high-speed movement notification (the second high-speed movement notification) to the eNB 200-2 and the eNB 200-3. The high-speed movement notification includes the D2D-RNTI included in the high-speed movement notification response and the reserved resource information indicating the reserved resources stored for the D2D group indicated by the D2D-RNTI. Each of the eNB 200-2 and the eNB 200-3 that have received the high-speed movement notification stores the reserved resource information (the reserved resources) included in the high-speed movement notification.

In step S110', the eNB 200-1 transmits the high-speed movement notification response to the D2D group (the UE 100-1 and the UE 100-2). In the present modification, the high-speed movement notification response includes the reserved resource information indicating the reserved resources (RB) set to the network side in addition to the D2D-RNTI allocated to the D2D group.

In step S111, the D2D group (the UE 100-1 and the UE 100-2) performs the D2D communication using the reserved resources indicated by the reserved resource information (RB).

As described above, in the fourth modification of the first embodiment, the reserved resources (RB) are set at the initiative of the network. Particularly, by managing and setting the reserved resources (RB) through the EPC 20, it is possible to set the reserved resources (RB) to the wide area such as the tracking area without overlapping.

Fifth Modification of First Embodiment

In the first embodiment, the presence of a mobile relay station (hereinafter referred to as "mobile relay") is not considered. The mobile relay is a node that performs relay transmission between the eNB 200 and the UE 100 and installed in an electric train, a bus, or the like.

However, when the mobile relay that manages the serving cell of the D2D group moves together with the D2D group, although the D2D group is in the high-speed moving state, the serving cell does not change, and thus it is difficult to apply the operation according to the first embodiment.

In the fifth modification of the first embodiment, when the mobile relay manages the serving cell of the D2D group, and the mobile relay moves together with the D2D group, the mobile relay discards the high-speed movement notification (the first high-speed movement notification) received from the UE 100 included in the D2D group. As the mobile relay discards the high-speed movement notification received from the UE 100, the high-speed movement notification is not transmitted to the eNB 200, and thus it is possible to prevent an unintended operation.

However, when the D2D group is not under the control of the mobile relay, it is desirable to make it possible to apply the operation according to the first embodiment.

In this regard, in the fifth modification of the first embodiment, when the mobile relay manages the serving cell, and the mobile relay moves together with the D2D group, if the serving cell is changed, the UE 100 included in the D2D group transmits the high-speed movement notification (the first high-speed movement notification) to the changed serving cell. Accordingly, it is desirable to make it possible to apply the operation according to the first embodiment.

Second Embodiment

A second embodiment will be described focusing on different points from the first embodiment. The second embodiment differs from the first embodiment in a system configuration.

(Communication Control Method According to Second Embodiment)

The second embodiment will be described in connection with an operation of changing the serving cell and/or the tracking area through the D2D group in the high-speed moving state.

Figure 14:
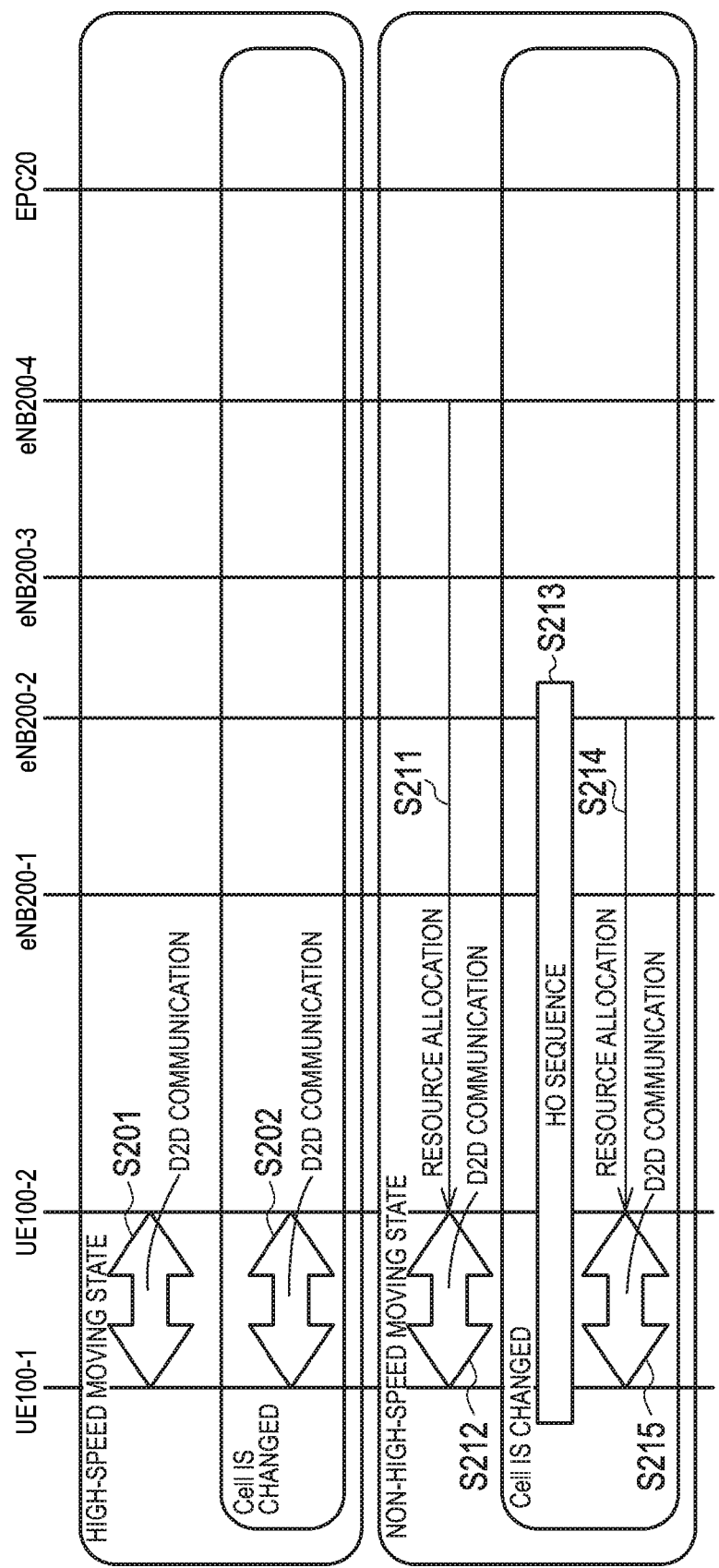
FIG. 14 is a sequence diagram illustrating an operation when a D2D group changes a serving cell according to the second embodiment.

FIG. 14 is a sequence diagram illustrating an operation of changing the serving cell through the D2D group. Here, the D2D group is assumed to change the serving cell from the cell of the eNB 200-4 to the cell of the eNB 200-2.

As illustrated in FIG. 14, the D2D group (the UE 100-1 and the UE 100-2) in the high-speed moving state performs the D2D communication while performing the UE-initiated scheduling within the range of the reserved resources (step S201). Further, the D2D group (the UE 100-1 and the UE 100-2) in the high-speed moving state transitions to the RRC idle state when the D2D-RNTI is allocated thereto.

When the D2D group (the UE 100-1 and the UE 100-2) to which the D2D-RNTI is allocated changes the serving cell with the movement, each of the UE 100-1 and the UE 100-2 omits the handover process. Each of the UE 100-1 and the UE 100-2 may perform cell reselection instead of omitting the handover process. Then, even when the serving cell is changed, the D2D group (the UE 100-1 and the UE 100-2) continuously perform the D2D communication while performing the UE-initiated scheduling within the range of the reserved resources (step S202).

Meanwhile, the eNB 200-4 performs the eNB-initiated scheduling for the D2D group in the non-high-speed moving state, and the eNB 200-4 notifies the D2D group (the UE 100-1 and the UE 100-2) of the allocation radio resources (step S211). Then, the UE 100-1 and the UE 100-2 perform the D2D communication using the allocation radio resources (step S212). The D2D group in the non-high-speed moving state is not allocated the D2D-RNTI and is in the RRC connection state.

When the D2D group (the UE 100-1 and the UE 100-2) that is not allocated the D2D-RNTI changes the serving cell with the movement, each of the UE 100-1 and the UE 100-2 performs the handover process (step S213). Each of the UE 100-1 and the UE 100-2 is allocated a new C-RNTI in the handover process.

After the handover, the eNB 200-2 performs the eNB-initiated scheduling, and the eNB 200-2 notifies the D2D group (the UE 100-1 and the UE 100-2) of the allocation radio resources (step S214). Then, the UE 100-1 and the UE 100-2 perform the D2D communication using the allocation radio resources (step S215).

Figure 15:
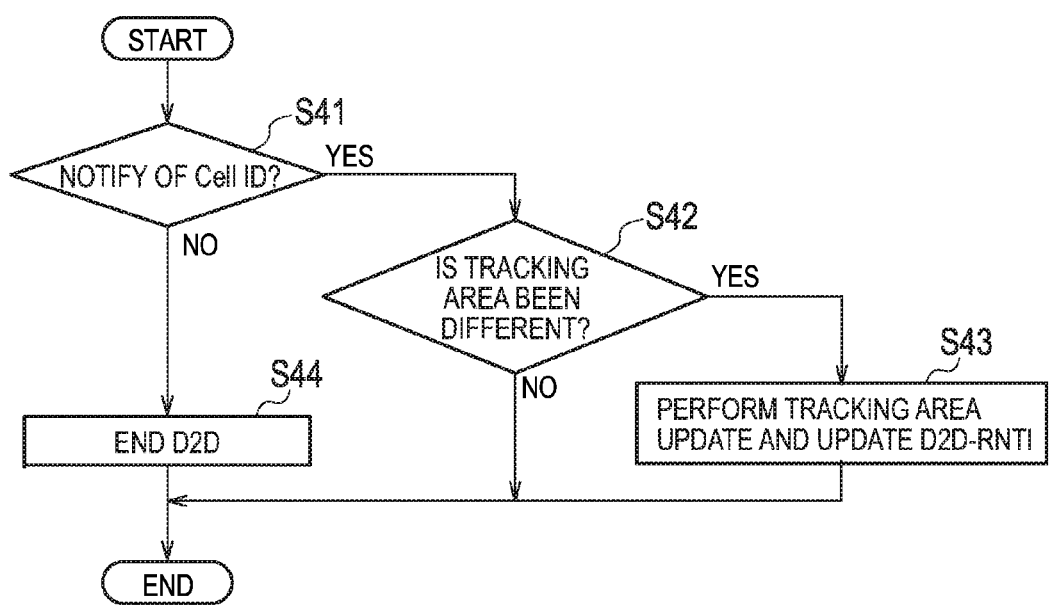
FIG. 15 is a flowchart illustrating an operation when a D2D group in a high-speed moving state changes a tracking area according to the second embodiment.

FIG. 15 is a flowchart illustrating an operation of changing the tracking area through the D2D group in the high-speed moving state. Here, an operation of the UE 100-2 included in the D2D group in the high-speed moving state will be described as an example, but the UE 100-1 included in the D2D group also performs the same operation as the UE 100-2.

As illustrated in FIG. 15, the UE 100-2 determines whether or not the cell ID of the serving cell has been detected based on a radio signal received from the network. When the cell ID of the serving cell has not detected (No in step S41), that is, when it is outside the service area (that is, out of service), in step S44, the UE 100-2 ends the D2D communication. The UE 100-2 continuously holds the D2D-RNTI even after the D2D communication ends. Then, the UE 100-2 releases the D2D-RNTI when a certain period of time elapses after the D2D communication ends.

On the other hand, when the cell ID of the serving cell has been detected (Yes in step S41), in step S42, the UE 100-2 determines whether or not the tracking area to which the serving cell belongs has been changed based on the cell ID.

When the tracking area to which the serving cell belongs has been changed (Yes in step S42), in step S43, the UE 100-2 performs a tracking area update (TAU). Specifically, the UE 100-2 transmits a TAU message to the EPC 20 (MME) through the serving cell. In response to the resection of the TAU message, the EPC 20 updates the D2D-RNTI to be allocated to the D2D group.

The UE 100-2 temporarily suspends the D2D communication (but, maintains a connection of the physical layer) until a new D2D-RNTI is allocated after the change of the tracking area is detected. Then, when the new D2D-RNTI is allocated, the UE 100-2 resumes the D2D communication.

Figure 16:
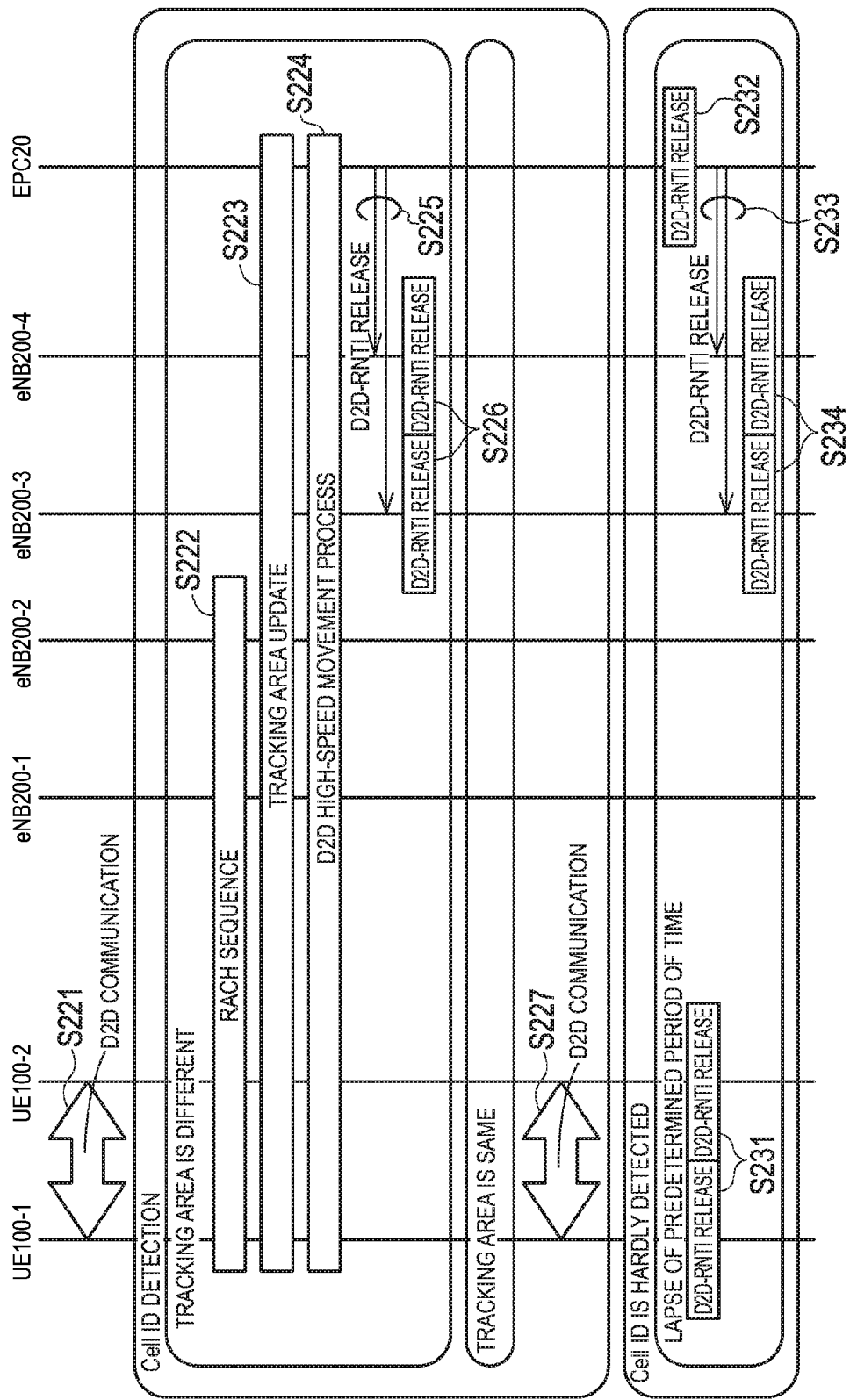
FIG. 16 is a sequence diagram illustrating an operation according to the third embodiment.

FIG. 16 is a sequence diagram illustrating an operation according to the second embodiment. First, an operation of changing the serving cell from the cell of the eNB 200-4 to the cell of the eNB 200-2 through the D2D group will be described. The cell of the eNB 200-1 and the cell of the eNB 200-2 belong to a first tracking area, and the cell of the eNB 200-3 and the cell of the eNB 200-4 belong to a second tracking area.

As illustrated in FIG. 16, in step S221, the D2D group (the UE 100-1 and the UE 100-2) in the high-speed moving state performs the D2D communication while performing the UE-initiated scheduling within the range of the reserved resources. Further, the D2D group (the UE 100-1 and the UE 100-2) in the high-speed moving state transitions to the RRC idle state when the D2D-RNTI is allocated.

Here, the D2D group (the UE 100-1 and the UE 100-2) detects the change of the serving cell based on the cell ID. Further, the D2D group (the UE 100-1 and the UE 100-2) detect that the tracking area to which the new serving cell belongs is different from the tracking area to which the serving cell before change belongs.

In step S222, the D2D group (the UE 100-1 and the UE 100-2) performs a random access process (a RACH sequence) on the eNB 200-2 in order to establish the RRC connection with the cell of the eNB 200-2.

In step S223, the D2D group (the UE 100-1 and the UE 100-2) that has established the RRC connection with the cell of the eNB 200-2 performs the tracking area update (TAU). Specifically, the D2D group (the UE 100-1 and the UE 100-2) transmits the TAU message to the EPC 20 (MME) through the eNB 200-2.

In step S224, through the operation described in the first embodiment, the D2D group (the UE 100-1 and the UE 100-2) and the network sets the reserved resources in the cells included in the new tracking area, and sets (updates) the D2D-RNTI that is used in common in the new tracking area. Here, in response to the reception of the TAU message, the EPC 20 updates the D2D-RNTI to be allocated to the D2D group.

In step S225, the EPC 20 requests the eNB 200-3 and the eNB 200-4 to which the tracking area before the change belongs to release the D2D-RNTI.

In step S226, each of the eNB 200-3 and the eNB 200-4 releases the D2D-RNTI according to the D2D-RNTI release request received from the EPC 20. Further, each of the eNB 200-3 and the eNB 200-4 releases the D2D-RNTI, and releases the resource reservation corresponding to the D2D group (the UE 100-1 and the UE 100-2).

Further, when the change of the tracking area does not occur, the process of steps S222 to S226 is not performed.

In step S227, the D2D group (the UE 100-1 and the UE 100-2) performs the D2D communication.

Next, an operation when the cell ID has not been detected, that is, when the D2D group in the high-speed moving state moves to be outside the service area (out of service) will be described.

In step S231, when the cell ID is not detected, the D2D group (the UE 100-1 and the UE 100-2) ends the D2D communication and releases the D2D-RNTI after a certain period of time elapses after the D2D communication ends.

In step S232, the EPC 20 detects that the D2D group (the UE 100-1 and the UE 100-2) has moved to the service area, and releases the D2D-RNTI allocated to the D2D group (the UE 100-1 and the UE 100-2). Examples of a method of detecting that the D2D group has moved to the service area in the network include first to third methods. The first method is a method in which the network periodically performs paging on the D2D group and checking the presence or absence of a paging response (alive ack) from the D2D group. The second method is a method in which the presence or absence of alive ack is checked by periodically transmitting alive ack from the D2D group to the network without paging. The third method is a method in which the D2D group periodically performs a re-synchronization process with the network and checks the presence or absence of the re-synchronization process. Further, it is possible to identify the D2D group through the D2D-RNTI even in any of the first method to the third method.

In step S233, the EPC 20 requests the eNB 200-3 and the eNB 200-4 to release the D2D-RNTI.

In step S234, each of the eNB 200-3 and the eNB 200-4 releases the D2D-RNTI in response to the D2D-RNTI release request received from the EPC 20. Further, each the eNB 200-3 and the eNB 200-4 releases the D2D-RNTI, and releases the resource reservation corresponding to the D2D group (the UE 100-1 and the UE 100-2).

Conclusion of Second Embodiment

As described above, in the second embodiment, when the serving cell is changed as the D2D group to which the D2D-RNTI is allocated moves, the handover process is omitted. The D2D group (the UE 100-1 and the UE 100-2) in the high-speed moving state is managed by the common D2D-RNTI in the tracking area, and thus it is possible to omit the handover process.

In the second embodiment, when the D2D group to which the D2D-RNTI is allocated moves the service area, the D2D communication ends. Thus, it is possible to prevent the D2D communication that can be managed by the network from being performed.

In the second embodiment, when the D2D group to which the D2D-RNTI is allocated has moved to the service area, and then the D2D communication has ended, the D2D-RNTI is released after a certain period of time elapses after the D2D communication ends. In other words, the D2D group to which the D2D-RNTI is allocated holds the D2D-RNTI until the certain period of time elapses even when the D2D communication ends. Thus, when the D2D group moves into the service area again within the certain period of time, the D2D communication can be resumed.

In the second embodiment, when the D2D group to which the D2D-RNTI is allocated changes the tracking area to exist with the movement, the TAU message is transmitted from the UE 100 to the network. The network that has received the TAU message allocates the new D2D-RNTI to the D2D group. Thus, the D2D group can be managed in units of tracking areas. The resource reservation is performed in units of tracking areas, and when the TAU is performed, the resource reservation is performed again in each cell in the new tracking area.

Modification of Second Embodiment

As described above, the D2D-RNTI identifies the D2D group in the high-speed moving state, and there are cases in which one D2D-RNTI is allocated to each tracking area, cases in which one D2D-RNTI is allocated to each D2D group, and cases in which one D2D-RNTI is allocated to each of the UEs 100 included in the D2D group.

Here, when the D2D-RNTI includes one common portion in the tracking area, and the UEs 100 included in the D2D group can be identified through the remaining portions, the network can identify that it is the D2D group in the high-speed moving state through one D2D-RNTI and identify the UEs 100 included in the D2D group.

In this regard, in the modification of the second embodiment, the D2D-RNTI includes a body portion (a common portion) in which one body portion is allocated within the tracking area and extension portions (low-order extension numbers) each of which differs according to each of the UEs 100 included in the D2D group. As described above, by extending the D2D-RNTI, it is possible to identify the UE 100 using the extension portion (the low-order extension number).

Third Embodiment

A third embodiment will be described focusing on different points from the first embodiment. The third embodiment is the same in the system configuration as the first embodiment.

(Communication Control Method According to Third Embodiment)

In the third embodiment, the description will proceed with an operation when the D2D group in the high-speed moving state transitions to the non-high-speed moving state.

Figure 17:
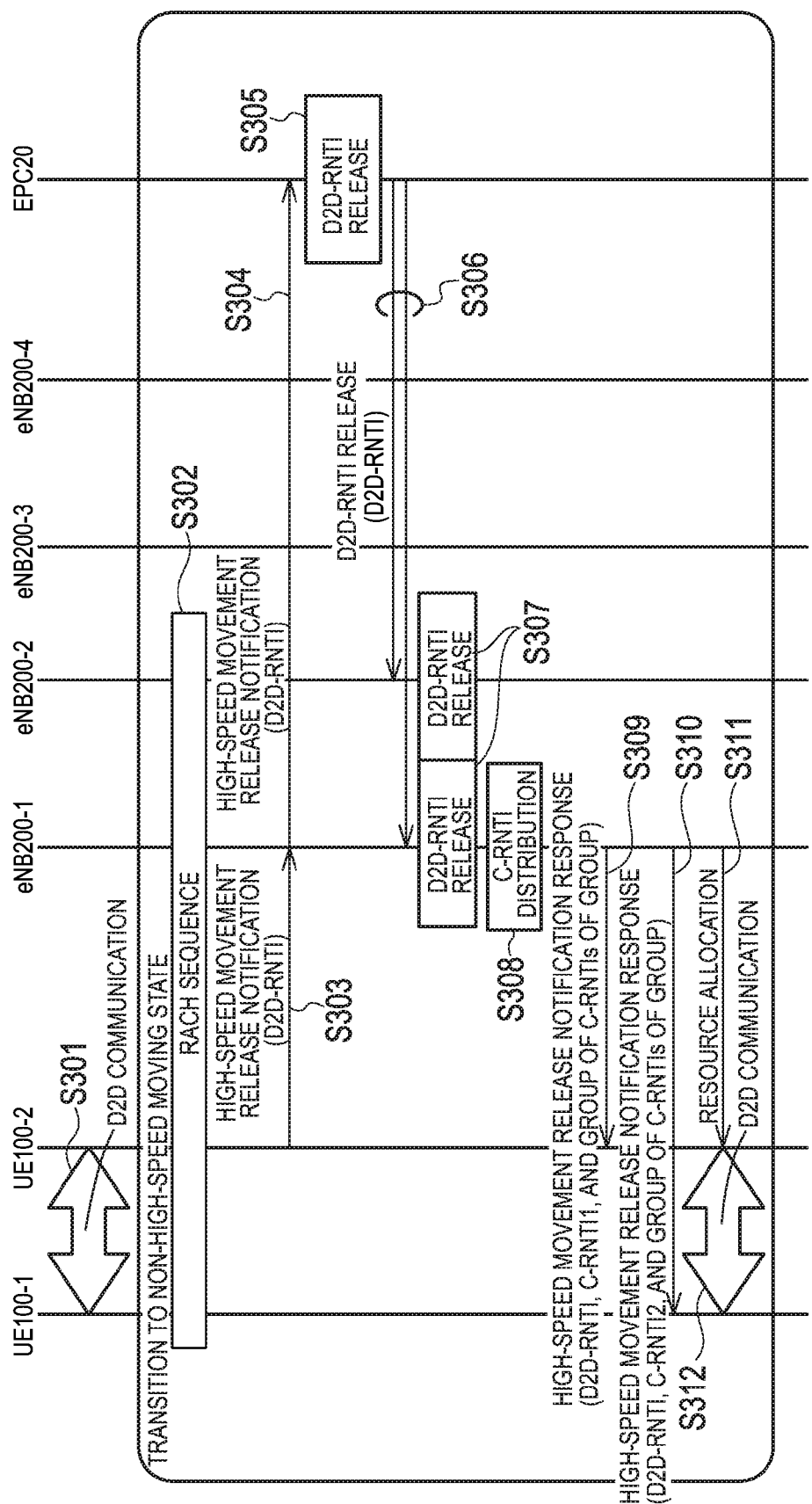
FIG. 17 is a sequence diagram illustrating a first operation pattern according to the third embodiment.

FIG. 17 is a sequence diagram illustrating a first operation pattern according to the third embodiment. Here, the D2D group is assumed to exist in the cell of the eNB 200-1. The cell of the eNB 200-1 and the cell of the eNB 200-2 belong to the same tracking area.

As illustrated in FIG. 17, in step S301, the D2D group (the UE 100-1 and the UE 100-2) in the high-speed moving state performs the D2D communication while performing the UE-initiated scheduling within the range of the reserved resources.

Here, it is detected that the D2D group (the UE 100-1 and the UE 100-2) has transitioned to the non-high-speed moving state. Specifically, it is detected that the moving speed (V) of the D2D group is less than the threshold value (Vth).

In step S302, in order to establish the RRC connection with the cell of the eNB 200-1, the D2D group (the UE 100-1 and the UE 100-2) performs the random access process (the RACH sequence) on the eNB 200-1. In the first operation pattern, in the random access process, the C-RNTI is not allocated to each of the UE 100-1 and the UE 100-2.

In step S303, the UE 100-2 transmits a high-speed movement release notification indicating that transition to the non-high-speed moving state has been performed to the serving cell (the eNB 200-1). The high-speed movement release notification includes the D2D-RNTI allocated to the D2D group (the UE 100-1 and the UE 100-2).

In step S304, the eNB 200-1 that has received the high-speed movement release notification transfers the high-speed movement release notification to the EPC 20.

In step S305, the EPC 20 that has received the high-speed movement release notification releases the D2D-RNTI allocated to the D2D group (the UE 100-1 and the UE 100-2).

In step S306, the EPC 20 transmits a D2D-RNTI release request to the eNB 200-1 and the eNB 200-2. The release request includes the D2D-RNTI of the release target.

In step S307, each of the eNB 200-1 and the eNB 200-2 that have received the D2D-RNTI release request releases the D2D-RNTI allocated to the D2D group (the UE 100-1 and the UE 100-2).

In step S308, the eNB 200-1 decides the C-RNTIs to be allocated to the UE 100-1 and the UE 100-2. The UE 100-1 and the UE 100-2 differ in the C-RNTI.

In step S309, the eNB 200-1 transmits a high-speed movement release notification response to the UE 100-2. The high-speed movement release notification response includes the D2D-RNTI allocated to the D2D group (the UE 100-1 and the UE 100-2), the C-RNTI (a C-RNTI1) allocated to the UE 100-2, and the C-RNTIs (a group of C-RNTIs) allocated to the UEs 100 included in the D2D group.

In step S310, the eNB 200-1 transmits the high-speed movement release notification response to the UE 100-1. The high-speed movement release notification response includes the D2D-RNTI allocated to the D2D group (the UE 100-1 and the UE 100-2), the C-RNTI (a C-RNTI2) allocated to the UE 100-1, and the C-RNTIs (a group of C-RNTIs) allocated to the UEs 100 included in the D2D group.

Each of the UE 100-1 and the UE 100-2 transitions to the RRC connection state, and performs switching from the UE-initiated scheduling to the eNB-initiated scheduling.

In step S311, the eNB 200-1 decides the allocation radio resources to be allocated to the D2D group (the UE 100-1 and the UE 100-2), and notifies the D2D group (the UE 100-1 and the UE 100-2) of the allocation radio resources.

In step S312, the D2D group (the UE 100-1 and the UE 100-2) performs the D2D communication using the notified allocation radio resources.

Figure 18:
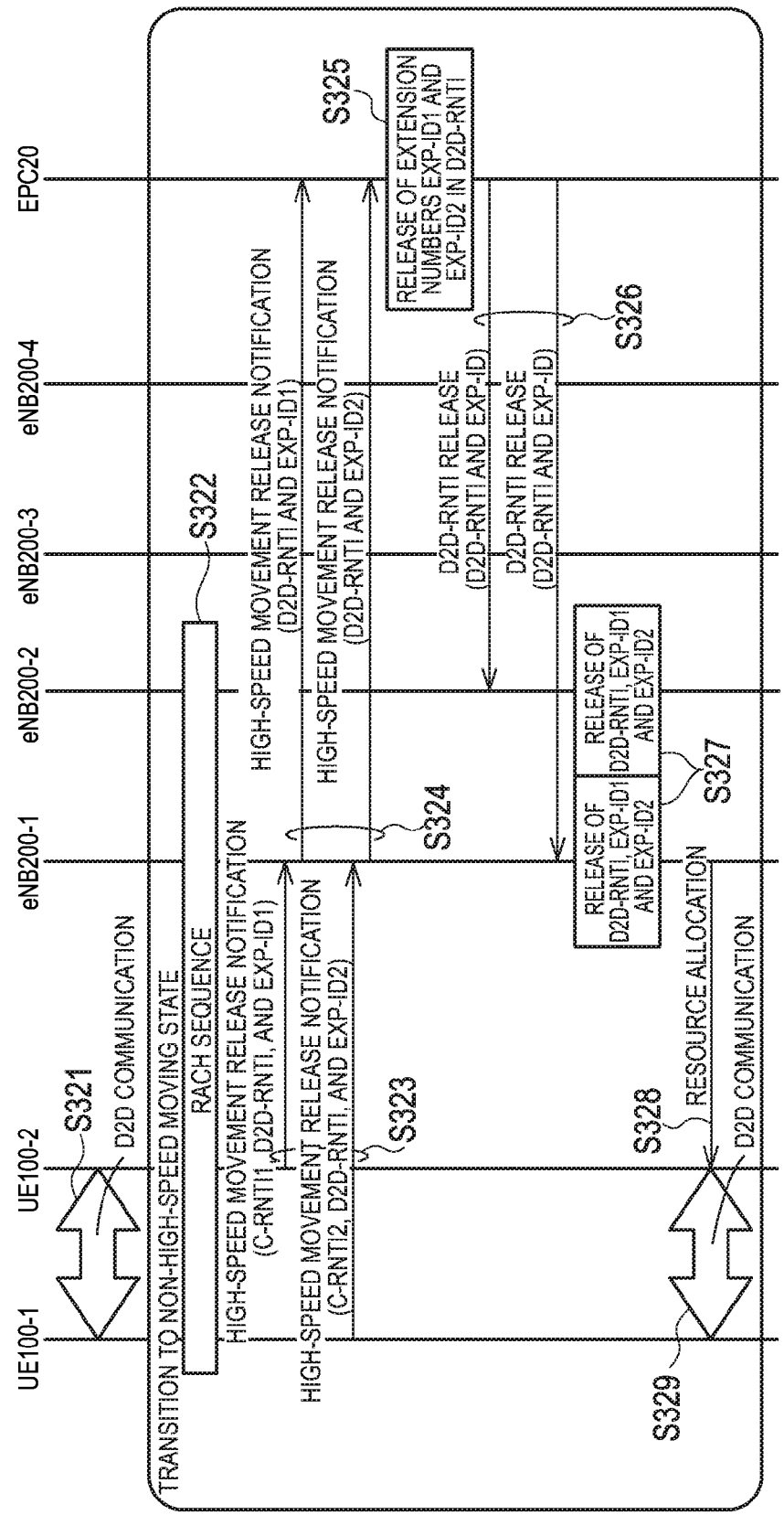
FIG. 18 is a sequence diagram illustrating a second operation pattern according to the third embodiment.

FIG. 18 is a sequence diagram illustrating a second operation pattern according to the third embodiment. As described in the modification of the second embodiment, the second operation pattern differs from the first operation pattern in that an extension number (EX-ID) is set to the D2D-RNTI.

As illustrated in FIG. 18, in step S321, the D2D group (the UE 100-1 and the UE 100-2) in the high-speed moving state performs the D2D communication while performing the UE-initiated scheduling within the range of the reserved resources.

Here, it is detected that the D2D group (the UE 100-1 and the UE 100-2) is not in the high-speed moving state. Specifically, it is detected that the moving speed (V) of the D2D group is less than the threshold value (Vth).

In step S322, in order to establish the RRC connection with the cell of the eNB 200-1, the D2D group (the UE 100-1 and the UE 100-2) performs the random access process (the RACH sequence) on the eNB 200-1. In the second operation pattern, in the random access process, the C-RNTI is allocated to each of the UE 100-1 and the UE 100-2.

Each of the UE 100-1 and the UE 100-2 transitions to the RRC connection state, and performs switching from the UE-initiated scheduling to the eNB-initiated scheduling.

In step S323, the UE 100-2 transmits the high-speed movement release notification indicating that transition to the non-high-speed moving state has been performed to the serving cell (the eNB 200-1). In the second operation pattern, the high-speed movement release notification includes the C-RNTI (the C-RNTI1) allocated to the UE 100-2 and an extension number (EXP-ID1) allocated to the UE 100-2 in addition to the D2D-RNTI allocated to the D2D group (the UE 100-1 and the UE 100-2).

Further, the UE 100-1 transmits the high-speed movement release notification indicating that transition to the non-high-speed moving state has been performed to the serving cell (the eNB 200-1). The high-speed movement release notification includes the C-RNTI (the C-RNTI2) allocated to the UE 100-1 and an extension number (EXP-ID2) allocated to the UE 100-2 in addition to the D2D-RNTI allocated to the D2D group (the UE 100-1 and the UE 100-2).

In step S324, the eNB 200-1 acquires the D2D-RNTI and the extension number (EXP-ID1) included in the high-speed movement release notification received from the UE 100-2, and transmits the high-speed movement release notification including the D2D-RNTI and the extension number (EXP-ID1) to the EPC 20.

Further, the eNB 200-1 acquires the D2D-RNTI and the extension number (EXP-ID2) included in the high-speed movement release notification received from the UE 100-1, and transmits the high-speed movement release notification including the D2D-RNTI and the extension number (EXP-ID2) to the EPC 20.

In step S325, the EPC 20 that has received the high-speed movement release notification releases the extension number (EXP-ID1) allocated to the UE 100-2 and the extension number (EXP-ID2) allocated to the UE 100-1.

In step S326, the EPC 20 transmits the D2D-RNTI release request to the eNB 200-1 and the eNB 200-2. The release request includes the D2D-RNTI and the extension number (EXP-ID) of the release target.

In step S327, each of the eNB 200-1 and the eNB 200-2 that have received the D2D-RNTI release request releases the D2D-RNTI allocated to the D2D group (the UE 100-1 and the UE 100-2), the extension number (EXP-ID1) allocated to the UE 100-2, and the extension number (EXPID2) allocated to the UE 100-1.

In step S328, the eNB 200-1 decides the allocation radio resources to be allocated to the D2D group (the UE 100-1 and the UE 100-2), and notifies the D2D group (the UE 100-1 and the UE 100-2) of the allocation radio resources.

In step S329, the D2D group (the UE 100-1 and the UE 100-2) performs the D2D communication using the notified allocation radio resources.

Further, when one reserved resource is shared by a plurality of D2D groups, if one of the D2D groups is released, and there is another D2D group using the same resources, the resources is not deleted from the reservation. On the other hand, when there is no D2D group using the same resources, the resources are not deleted from the reservation.

Conclusion of Third Embodiment

As described above, when the D2D group has transitioned from the high-speed moving state to the non-high-speed moving state, the eNB 200 that manages the serving cell of the D2D group allocates the C-RNTI used for control in the serving cell to the UEs 100 included in the D2D group. Further, when the D2D group has transitioned the high-speed moving state to the non-high-speed moving state, the UEs 100 included in the D2D group and network releases the D2D-RNTI. Thus, when the D2D group has transitioned from the high-speed moving state to the non-high-speed moving state, it is possible to perform switching from the UE-initiated scheduling to the eNB-initiated scheduling.

Modification of Third Embodiment

In the third embodiment, when the D2D group has transitioned from the high-speed moving state to the non-high-speed moving state, the D2D-RNTI is released in order to allocate the C-RNTI. However, when the D2D group temporarily transitions to the non-high-speed moving state, and transitions (returns) to the high-speed moving state again, it is desirable to maintain the D2D-RNTI without allocating the C-RNTI. For example, such an intermittent high-speed moving state may occur in a situation in which an electric train temporarily stops at a station or a bus temporarily stops at a stop.

In this regard, in the modification of the third embodiment, even when the D2D group has transitioned from the high-speed moving state to the non-high-speed moving state, and the D2D group is determined to be likely to transition to the high-speed moving state again, the D2D-RNTI is maintained without allocating the C-RNTI. Here, when the D2D group is determined to be likely to transition to the high-speed moving state again, for example, there are cases in which the high-speed movement notification/high-speed movement release notification are generated a predetermined number of times within a certain period of time. In this case, the UE 100 included in the D2D group and the network set an intermittent mode.

Figure 19:
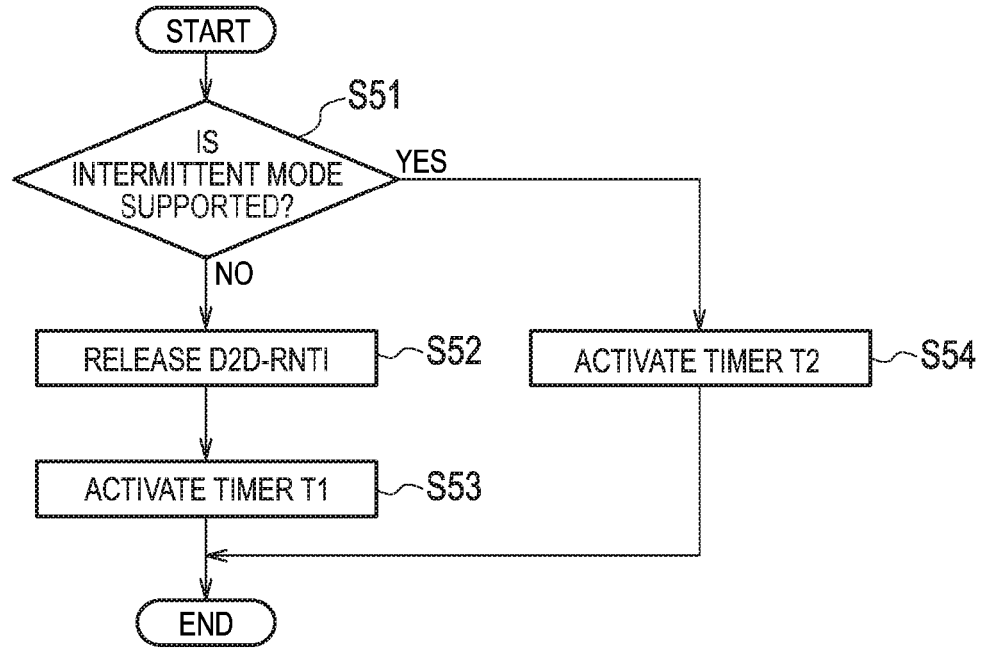
FIG. 19 is a flowchart illustrating an operation at the time of high-speed movement release according to a modification of the third embodiment.

FIG. 19 is a flowchart illustrating an operation at the time of high-speed movement release according to the modification of the third embodiment. The present flow is performed by the UE 100 included in the D2D group or the network.

As illustrated in FIG. 19, in step S51, it is determined whether or not the intermittent mode has been set.

When the intermittent mode has not been set (No in step S51), in step S52, the D2D-RNTI is released according to the high-speed movement release. Then, in step S53, a timer T1 is activated. The timer T1 is a timer used to determines whether or not the intermittent mode is to be set.

On the other hand, when the intermittent mode has been set (Yes in step S51), in step S54, a timer T2 is activated, and the D2D-RNTI is not released. The timer T2 is a timer for specifying a period of time in which the intermittent mode is maintained.

Figure 20:
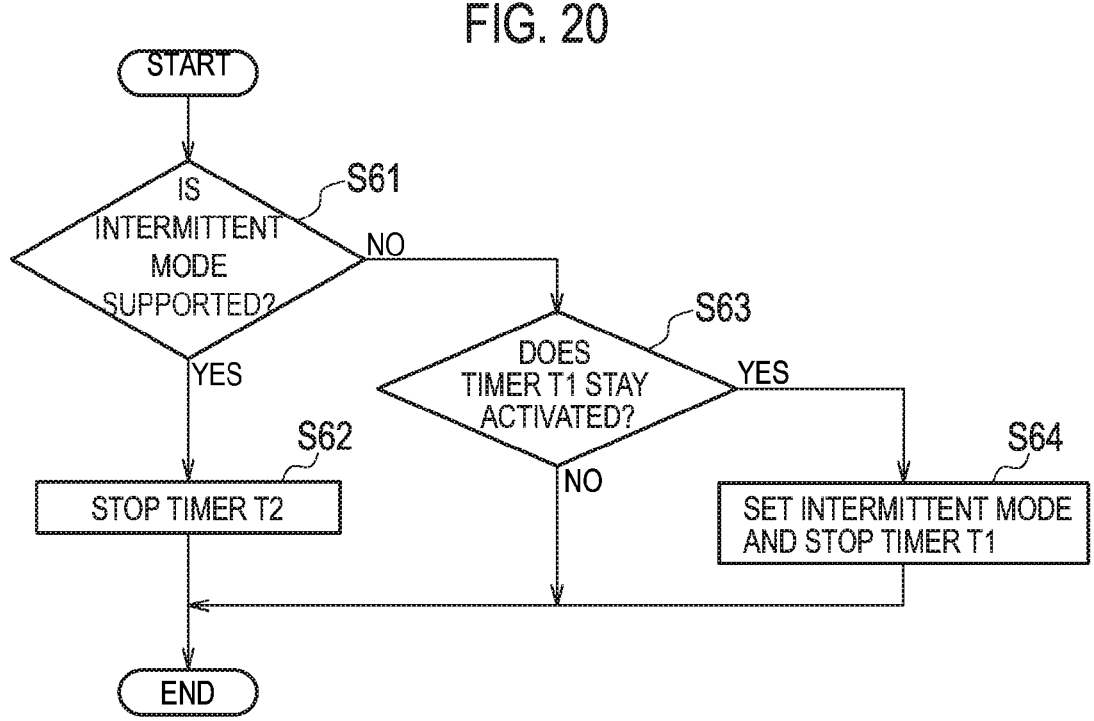
FIG. 20 is a flowchart illustrating an operation when transition from a non-high-speed moving state to a high-speed moving state is performed according to the modification of the third embodiment.

FIG. 20 is a flowchart illustrating an operation at the time of transition from the non-high-speed moving state to the high-speed moving state according to the modification of the third embodiment. The present flow is performed by the UE 100 included in the D2D group or the network.

As illustrated in FIG. 20, in step S61, it is determined whether or not the intermittent mode has been set.

When the intermittent mode has been set (Yes in step S61), in step S62, the timer T2 stops.

On the other hand, when the intermittent mode has not been set (No in step S61), in step S63, it determines whether or not the timer T1 stays activated.

When the timer T1 stays activated (Yes in step S63), in step S64, the intermittent mode is set, and the timer T1 stops.

Further, when the D2D communication ends in the D2D group, the intermittent mode is released, and the timers T1 and T2 stop.

Fourth Embodiment

A fourth embodiment will be described focusing on different points from the first embodiment. The fourth embodiment is the same as in the system configuration as the first embodiment.

(Communication Control Method According to Fourth Embodiment)

As described above, since the D2D group in the high-speed moving state is in the RRC idle state, it is commonly difficult to transmit information to the network unless the RRC connection is established through the random access process. However, sine a small amount of data such as a state notification is just transmitted, it is inefficient to establish the RRC connection. In this regard, in the fourth embodiment, the description will proceed with an operation for efficiently giving a state notification to the network through the D2D group in the high-speed moving state.

Figure 21:
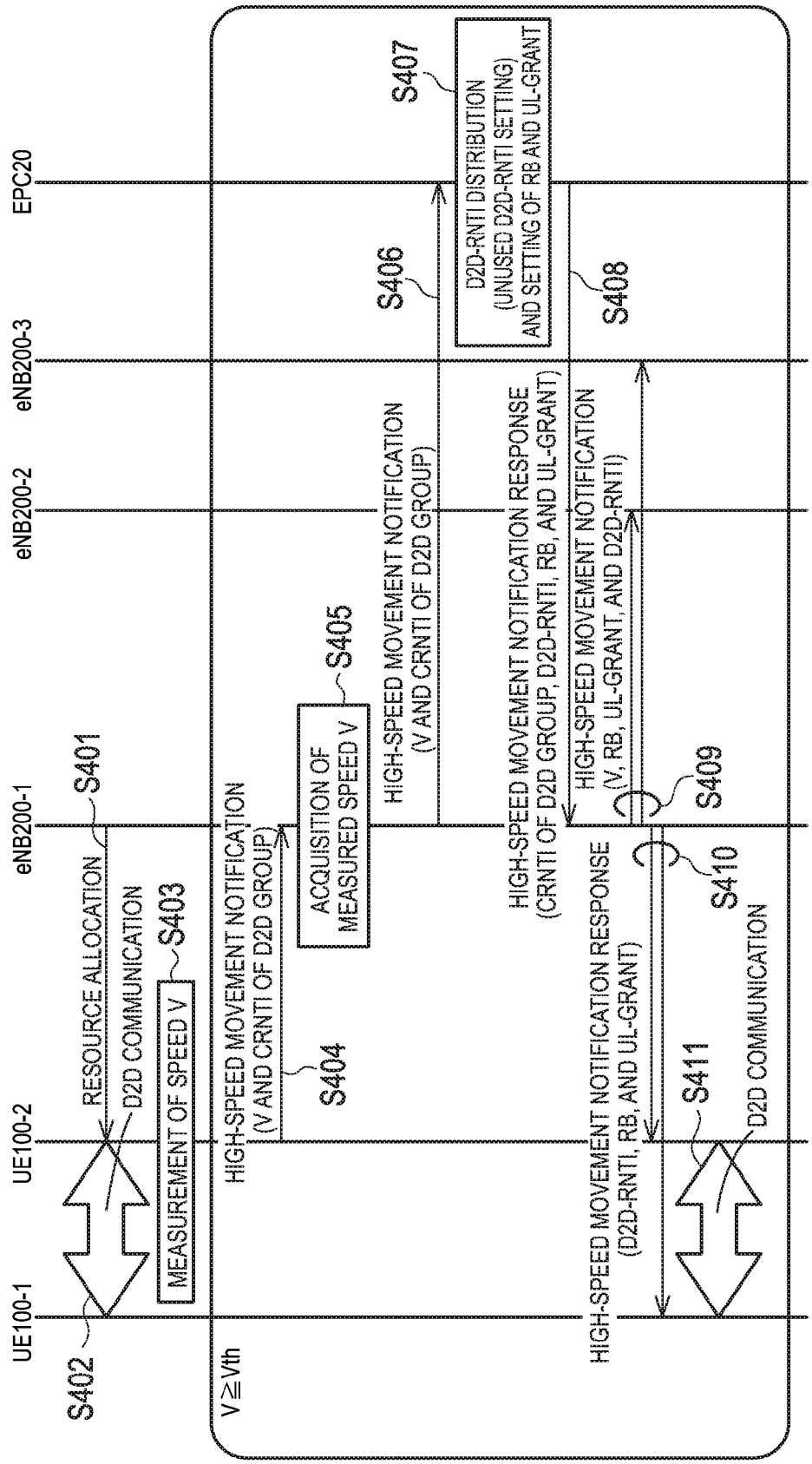
FIG. 21 is a sequence diagram illustrating an initial setting operation according to the fourth embodiment.

FIG. 21 is a sequence diagram illustrating an initial setting operation according to the fourth embodiment. Here, different points from the operation sequence according to the first embodiment will be described.

As illustrated in FIG. 21, steps S401 to S403 are the same as in the first embodiment.

In step S404, the UE 100 that has detected the high-speed moving state transmits the high-speed movement notification (the first high-speed movement notification) to the eNB 200-1. The high-speed movement notification includes the moving speed (V) and the C-RNTI.

In step S405, the eNB 200-1 that has received the high-speed movement notification acquires the speed information included in the high-speed movement notification.

In step S406, the eNB 200-1 transfers the high-speed movement notification received from the UE 100-2 to the EPC 20 (the core network).

In step S407, the EPC 20 that has received the high-speed movement notification allocates the D2D-RNTI to the D2D group (the UE 100-1 and the UE 100-2) based on the C-RNTIs included in the high-speed movement notification. In the fourth embodiment, the EPC 20 manages the reserved resources, and the EPC 20 sets the reserved resources (RB). Further, the EPC 20 manages state notification resource (UL-GRANT) that are uplink radio resources for the state notification, and the EPC 20 sets the state notification resources (UL-GRANT).

In step S408, the EPC 20 transmits the high-speed movement notification response including the D2D-RNTI allocated to the D2D group, the reserved resources (RB), and the state notification resources (UL-GRANT) to the eNB 200-1. The eNB 200-1 that has received the high-speed movement notification response stores the reserved resources (RB) and the state notification resources (UL-GRANT) stored in the high-speed movement notification response.

In step S409, the eNB 200-1 that has received the high-speed movement notification response transmits the high-speed movement notification (the second high-speed movement notification) to the eNB 200-2 and the eNB 200-3. The high-speed movement notification includes the D2D-RNTI, the moving speed (V) information, the reserved resource information indicating the reserved resources (RB), and the state notification resource information indicating the state notification resources (UL-GRANT). Each of the eNB 200-2 and the eNB 200-3 that have received the high-speed movement notification stores the reserved resources (RB) and the state notification resources (UL-GRANT) included in the high-speed movement notification.

In step S410, the eNB 200-1 transmits the high-speed movement notification response to the D2D group (the UE 100-1 and the UE 100-2). In the fourth embodiment, the high-speed movement notification response includes the reserved resource information indicating the reserved resources (RB) set at the network side and the state notification resource information indicating the state notification resources (UL-GRANT) set at the network side in addition to the D2D-RNTI allocated to the D2D group. Each of the UE 100-1 and the UE 100-2 stores the information included in the high-speed movement notification response.

In step S411, the D2D group (the UE 100-1 and the UE 100-2) performs the D2D communication using the reserved resources indicated by the reserved resource information (RB).

Figure 22:
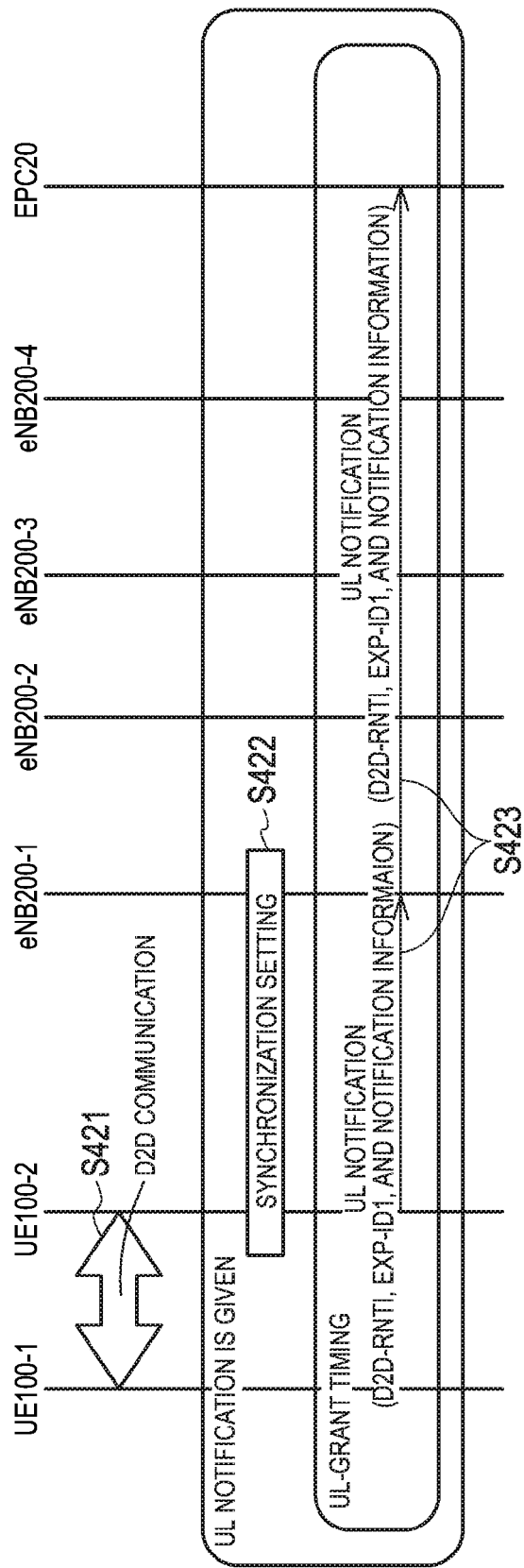
FIG. 22 is a sequence diagram illustrating a state notification operation according to the fourth embodiment.

FIG. 22 is a sequence diagram illustrating a state notification operation according to the fourth embodiment. Here, the extension number (EX-ID) is assumed to be set to the D2D-RNTI as described in the modification of the second embodiment.

As illustrated in FIG. 22, in step S421, the D2D group (the UE 100-1 and the UE 100-2) performs the D2D communication using the reserved resources (RB).

The UE 100-2 detects the occurrence of an event for which the state notification is given to the network.

In step S422, the UE 100-2 establishes synchronization with the serving cell (the eNB 200-1). Here, downlink synchronization with the serving cell is established through the cell search, and uplink synchronization is established through the random access process. The random access process includes a process of transmitting a random access preamble from the UE 100 to the eNB 200-1 and a process of transmitting a random access response from the eNB 200-1 to the UE 100. The eNB 200-1 measures an uplink delay based on the random access preamble, includes a timing correction value for guaranteeing the uplink delay in the random access response, and transmits the resulting random access response. However, the random access process is performed, but the process for establishing the RRC connection is not performed.

In step S423, the UE 100-2 transmits a state notification message to the serving cell (the eNB 200-1) using the state notification resources (UL-GRANT). The state notification message includes the D2D-RNTI allocated to the D2D group, the extension number (EX-ID1) allocated to the UE 100-2, and notification information indicating a state to be notified of. Examples of the notification information include position information, UE information (the number of UEs) in the D2D group, alive ack, and UE identification information. The MCS to be applied to transmission of the state notification message is specified in advance, and the UE 100-2 transmits the state notification message by applying the MCS that has been specified in advance.

The eNB 200-1 that has received the state notification message transfers the state notification message to the EPC 20. Here, the eNB 200-1 acquires the RRC setting information corresponding to the D2D-RNTI based on the D2D-RNTI included in the state notification message, and processes the state notification message using the RRC setting information.

Conclusion of Fourth Embodiment

As described above, the network reserves the state notification resources (UL-GRANT) used for the state notification from the D2D group to the network in the serving cell and the neighboring cell in response to the reception of the high-speed movement notification (the first high-speed movement notification) from the UE 100 included in the D2D group. The network transmits the state notification resource information indicating the received state notification resource (UL-GRANT) to the D2D group. Then, the UE 100 included in the D2D group transmits the state notification information together with the D2D-RNTI using the state notification resources (UL-GRANT). Thus, the UE 100 included in the D2D group in the high-speed moving state preferably reestablishes the synchronization, and the state notification information can be transmitted to the network even when the RRC connection is not established.

Other Embodiments

In the above embodiments, the moving speed (V) of the D2D group is measured by the UE 100 included in the D2D group. However, the moving speed (V) may be measured at the network side. For example, when there is a server apparatus that manages the position information of the UE 100, the moving speed (V) is measured based on the position information managed by the server apparatus. Alternatively, the number of handovers per unit time may be calculated based on existence cell information managed by the MME 300, and the moving speed (V) may be estimated based on the number of handovers per unit time. Alternatively, the moving speed (V) may be estimated based on the fading speed of the reception signal that the eNB 200 has received from the UE 100 included in the D2D group. Then, the network detects the high-speed moving state by comparing the moving speed (V) of the D2D group with the threshold value (Vth).

In the above-described embodiments, the LTE system has been described as an example of the mobile communication system, but the present invention is not limited to the LTE system and may be applied to a system other than the LTE system. In the system other than the LTE system, the operations performed by the eNB 200 (base station) in the above embodiments may be performed by a network apparatus (for example, a base station control apparatus) other than the base station.

This application claims the benefit of Japanese Priority Patent Application JP 2013-175715 filed on Aug. 27, 2013, the entire contents of which are incorporated herein by reference.

INDUSTRIAL APPLICABILITY

The present invention is useful in a mobile communication field.

The invention claimed is:

1. A communication control method of controlling D2D communication that is direct inter-terminal communication performed in a terminal group including a plurality of user terminals in a mobile communication system, the communication control method comprising the steps of:
reserving, by a network, target radio resources that are radio resources scheduled to be used for the D2D communication by the terminal group in a serving cell in which the terminal group exists and a neighboring cell adjacent to the serving cell when the terminal group in a high-speed moving state is detected; and
performing, by a first user terminal included in the terminal group, terminal-initiated scheduling of deciding allocation radio resources that are radio resources used for the D2D communication from among the reserved target radio resources.

2. The communication control method according to claim 1, further comprising the step of
performing, by a first base station that manages the serving cell in the network, base station-initiated scheduling of deciding the allocation radio resources when allocating radio resources to the terminal group that are not in the high-speed moving state.

3. The communication control method according to claim 1, further comprising the step of
reserving, by the network, the target radio resources in the serving cell without reserving the target radio resources in the neighboring cell when allocating radio resources to the terminal group that are not in the high-speed moving state.

4. The communication control method according to claim 1,
wherein the target radio resources are prohibited from being allocated to a second user terminal that is not included in the terminal group.

5. The communication control method according to claim 1,
wherein the target radio resources are allowed to be allocated to a second user terminal that is not included in the terminal group,
the communication control method further comprising the step of correcting, by the network, a modulation and encoding scheme to be applied to the second user terminal based on a moving speed of the terminal group when allocating the target radio resources to the second user terminal.

6. The communication control method according to claim 1,
wherein the target radio resources are allowed to be allocated to a second user terminal that is not included in the terminal group,
the communication control method further comprising the step of preferentially allocating, by the network, the target radio resources to the second user terminal of which transmission power level is set to a low level.

7. The communication control method according to claim 1, further comprising the step of
transmitting a first high-speed movement notification from the first user terminal to the serving cell in response to the detecting of the high-speed moving state by the first user terminal.

8. The communication control method according to claim 7,
wherein the first high-speed movement notification includes in-use resource information indicating radio resources being used for the D2D communication in the terminal group.

9. The communication control method according to claim 7, further comprising the step of
transmitting, by the network that has received the first high-speed movement notification, reserved resource information indicating the target radio resources to the first user terminal.

10. The communication control method according to claim 7, further comprising the step of
transmitting, by a first base station that manages the serving cell, a second high-speed movement notification to a second base station that manages the neighboring cell in response to the reception of the first high-speed movement notification,
wherein the second high-speed movement notification includes reserved resource information indicating the target radio resources.

11. The communication control method according to claim 7, further comprising the step
discarding, by a mobile relay station, the first high-speed movement notification received from the first user terminal when the relay station manages the serving cell and moves together with the terminal group.

12. The communication control method according to claim 7, further comprising the step of
transmitting, by the first user terminal, the first high-speed movement notification to a changed serving cell when a mobile relay station manages the serving cell, the relay station moves together with the terminal group, and the serving cell is changed.

13. The communication control method according to claim 7, further comprising the step of
allocating, by the network, a D2D radio network temporary identifier (D2D-RNTI) that is used in common in an area including the serving cell and the neighboring cell to the terminal group in the high-speed moving state in response to the reception of the first high-speed movement notification.

14. The communication control method according to claim 13,
wherein the D2D-RNTI includes a body portion in which one body portion is allocated in the area and extension portions each of which differs according to each of the user terminals included in the terminal group.

15. The communication control method according to claim 13, further comprising the step of
managing, by a core network accommodating a plurality of base stations in the network, an allocation of the D2D-RNTI.

16. The communication control method according to claim 15, further comprising the steps of:
deciding, by the core network, the D2D-RNTI to be allocated to the terminal group from among non-allocated D2D-RNTIs; and
notifying, by the core network, the terminal group of the decided D2D-RNTI.

17. The communication control method according to claim 13, further comprising the step of
omitting a handover process when the terminal group to which the D2D-RNTI is allocated changes the serving cell with movement of the terminal group.

18. The communication control method according to claim 13, further comprising the step of
ending the D2D communication when the terminal group to which the D2D-RNTI is allocated has moved to be outside a service area of the mobile communication system.

19. The communication control method according to claim 18, further comprising the step of
releasing the D2D-RNTI when a certain period of time elapses after the D2D communication ends when the terminal group to which the D2D-RNTI is allocated ends the D2D communication.

20. The communication control method according to claim 13, further comprising the steps of:
transmitting a tracking area update message from the first user terminal to the network when the terminal group to which the D2D-RNTI is allocated changes a tracking area to exist in with movement of the terminal group; and
allocating, by the network that has received the tracking area update message, a new D2D-RNTI to the terminal group.

21. The communication control method according to claim 13, further comprising the steps of:
- allocating, by a first base station that manages the serving cell in the network, cell radio network temporary identifier (C-RNTI) used in the serving cell to the first user terminal when the terminal group has transitioned from the high-speed moving state to a non-high-speed moving state; and
- releasing the D2D-RNTI when the terminal group has transitioned from the high-speed moving state to the non-high-speed moving state.

22. The communication control method according to claim 21, further comprising the step of
- maintaining the D2D-RNTI without allocating the C-RNTI in a case where the terminal group is determined to be likely to transition to the high-speed moving state again even when the terminal group has transitioned from the high-speed moving state to the non-high-speed moving state.

23. The communication control method according to claim 13, further comprising the steps of:
- reserving, by the network, state notification resource that is uplink radio resources used for state notification to be given from the terminal group to the network in the serving cell and the neighboring cell in response to the reception of the first high-speed movement notification;
- transmitting, by the network, state notification resource information indicating the reserved state notification resource to the terminal group; and
- transmitting, by the first user terminal, state notification information to the network together with the D2D-RNTI using the state notification resources indicated by the state notification resource information.

24. A user terminal included in a terminal group including a plurality of user terminals in a mobile communication system configured to support D2D communication that is direct inter-terminal communication performed within the terminal group, the user terminal comprising:
- a controller configured to perform terminal-initiated scheduling of deciding allocation radio resources that are radio resources used for the D2D communication from among target radio resources reserved in a serving cell in which the terminal group exists and a neighboring cell adjacent to the serving cell when the terminal group is detected to be in a high-speed moving state.

* * * * *